United States Patent [19]
Budow et al.

[11] Patent Number: 5,661,517
[45] Date of Patent: Aug. 26, 1997

[54] INTERACTIVE INTELLIGENT VIDEO INFORMATION SYSTEM

[75] Inventors: Harry S. Budow, Plano; Joel A. Pugh, Dallas, both of Tex.

[73] Assignee: MessagePhone, Inc., Dallas, Tex.

[21] Appl. No.: 631,629

[22] Filed: Apr. 8, 1996

Related U.S. Application Data

[63] Continuation of Ser. No. 236,641, May 2, 1994, abandoned.
[51] Int. Cl.$^6$ .............................. H04N 7/14; H04N 7/10
[52] U.S. Cl. .............................. 348/13; 348/10; 348/12; 455/5.1
[58] Field of Search .................... 348/1, 2, 3, 7, 348/8, 13, 10, 12; 455/4.1, 4.2, 6.1, 6.3, 5.1; 379/91, 105; H04N 7/173

[56] References Cited

U.S. PATENT DOCUMENTS

| | | | |
|---|---|---|---|
| 4,008,369 | 2/1977 | Theurer et al. | 348/3 |
| 4,789,863 | 12/1988 | Bush | 348/3 |
| 4,947,244 | 8/1990 | Fenwick et al. | 348/8 |
| 5,051,822 | 9/1991 | Rhoades | 348/3 |
| 5,077,607 | 12/1991 | Johnson et al. | 348/13 |
| 5,130,792 | 7/1992 | Tindell et al. | 348/7 |
| 5,133,079 | 7/1992 | Ballantyne et al. | 348/10 |
| 5,172,413 | 12/1992 | Bradley et al. | 348/7 |
| 5,323,448 | 6/1994 | Biggs | 348/3 |
| 5,333,181 | 7/1994 | Biggs | 379/91 |

Primary Examiner—John K. Peng
Assistant Examiner—John W. Miller
Attorney, Agent, or Firm—Haynes and Boone, L.L.P.

[57] ABSTRACT

Method and apparatus for providing customers of hospitality facilities with the ability to access a variety of amenities and to interact with a video system in order to enable point-of-sale purchase of and payment for goods and services with a credit or debit card. In a preferred embodiment, the video services system comprises a plurality of card readers arranged in a distributed configuration, each of which are associated with a room terminal of a video services system. In a preferred embodiment, each the card readers may be powered using power provided by an associated TV and room terminal. Each room terminal functions as an interface between the systems control computer and the card reader associated with the room terminal. When the room terminal is in communication with the systems control computer, by having been polled or by initiating a transmission, billing data previously entered by a customer using the card reader is transmitted to the systems control computer, which processes the billing data, and, based on the content and format thereof, accesses one or more data bases or card validation bureaus to which it is connected. Based on preprogrammed parameters and on information resulting from queries made to data bases, the systems control computer interacts with the customer by generating and transmitting graphics (or display) prompts or audio or visual prompts using the or by providing entertainment and information services.

49 Claims, 9 Drawing Sheets

We were unable to receive your credit/debit card information. Please enter your credit card again

OR

Manually enter your credit card number using the remote control.

OR

Your _(card name)_ expired on _(date)_. Please use another credit or debit card

OR

PRESS [1] To add the charge to your room bill.

OR

For a bank card (ATM)

Please enter your PIN now: _ _ _ _

OR

Your _(name)_ pre-paid debit card has insufficient funds for this service.

Please purchase another debit card in the lobby

OR

PRESS [1] To add the charge.

Fig. 7B

INTERACTIVE INTELLIGENT VIDEO INFORMATION SYSTEM

This a continuation of application Ser. No. 08/236,641 filed May 2, 1994 now abandoned.

FIELD OF THE INVENTION

The invention relates generally to video services systems and, more particularly, to method and apparatus for use in hospitality facilities to enable customers to interact with the video system used to provide point-of-sale purchasing of and payment for goods and services.

BACKGROUND OF THE INVENTION

It is well known that hospitality facilities, such as hotels, motels, hospitals, condominiums, operate in a highly competitive environment. In order to attract customers and generate additional revenue, such hospitality facilities often offer a wide variety of services, including an assortment of video entertainment services. In addition to broadcast and cable television, hotels and motels often have video services systems that offer pay-per-view and video-on-demand, as well as a variety of interactive services. Pay-per-view services are scheduled movie services that generally utilize video cassette players installed in a remote location. Typically, the cassette players are loaded with preselected video cassette tapes to be broadcast at preselected, or scheduled, times. Additionally, the programming can be accessed by multiple television sets at any given time while the transmission is in progress. Pay-per-view programming also may be digitized, stored and shown from a computerized video server.

Video-on-demand services enable customers to select a program to be viewed at the customer's convenience. Viewing times are not prescheduled and customers are typically given a choice of a large number of programming alternatives. Generally, unlike scheduled pay-per-view programming, video-on-demand programming selected by the customer is typically accessible only by that customer. The transmission of the programming then is "switched" in a manner so that only the one customer's television set receives the broadcast. Alternatively, some video-on-demand systems do provide "join in progress" capability, such that other customers may view the selected programming. A video-on-demand system may include a robotic device for removing the selected video tape from a storage rack and placing it in an appropriate video cassette player or may include large numbers of individual video cassette players designed in such a manner that the customer's selection of a particular program activates only the video cassette player containing the desired programming. It is also contemplated that future video-on-demand services will be provided from a computer server via transmission facilities of a local telephone company or via satellite transmission. In this case, if the video server were located within the hospitality facility, it would receive the transmissions from the telephone company transmission facilities or the satellite transmission and store them in a digitized form for subsequent viewing by the facility's customers.

Usually pay-per-view and/or video-on-demand systems (collectively, "video services systems") that supply video services are not owned by the hospitality facility, but provided by a third party company. Accordingly, there are a limited number of methods which can be used by customers to pay for the services provided by video services systems. With most state-of-the-art systems, the cost associated with a given video service transaction is added to the customer's room bill. Typically, a systems control computer polls the various room terminals, or waits for status signals from the room terminals, to determine whether a customer occupying the room associated with a particular room terminal has viewed a pay-per-view movie for a predetermined length of time, for example, 5 minutes, or whether the customer has made a video-on-demand selection. If it is determined that the customer has viewed the selected programming for a predetermined length of time or after the transmission of the video-on-demand selection has begun, the systems control computer formats and saves a report of the transaction. Alternatively, the systems control computer may transmit the formatted report, typically via a data I/O port, to a printer to be printed. In either case, at some point, a human attendant will retrieve the report and include the transaction as part of the customer's room bill.

Alternatively, in an advancement of the art, the systems control computer may be connected to a property management system of the hospitality facility via an RS-232 serial interface. The systems control computer formats the transaction report, as described above, and then transmits the report to the property management system to be included in the customer's file, or portfolio, which is stored in a data base of the property management system.

Presently, video services systems may also be used to add charges for goods and services other than video programming to the room bill. For example, the systems control computer may be capable of formatting information contained in the portfolio of a particular customer stored in the property management system and transmitting the formatted information to the television set of the customer's room for display thereon. If desired, the customer may use a remote control keypad associated with the television set to approve payment of the room bill with a preapproved credit card number entered into the customer's portfolio during check-in. The customer's room bill is retrieved by the systems control computer from the property management system portfolio. This information is formatted into preprogrammed graphic screens. The customer responds to the graphic screens with the remote control keypad. For example, "Press #1 if the bill is correct; press #9 if the bill is incorrect. Press #7 if you wish to pay for the bill using the credit card number given to this establishment when you checked in." The remote control keypad generates infrared signals that are then converted to radio frequency (RF) signals and transmitted to the systems control computer.

Prior art video services systems also allow customers to use the remote control keypad to reenter a credit card number in order to compare it with the preapproved card number already stored during check-in at the property management system in the customer's portfolio. In this manner, the system can be utilized to verify that the credit card number is correct and/or to verify that the customer is the rightful owner of the card. The same technology also enables customers to order and bill meals and other goods and services to their room bills.

A recent advancement in the art enables customers to order and pay for a pay-per-view movie, an on-demand movie, or some other amenity by credit or debit card using a telephone with a built-on card swipe or using the telephone keypad to enter billing information. The billing information is transmitted, via standard dual tone multifrequency (DTMF) tones, via a private branch exchange (PBX) of the hospitality establishment or a public switched network, to a centralized processor. The charge for the transaction may appear on the room bill or, with this advancement, may be billed to the card. In this manner, customers may purchase entertainment and amenities with prepaid cards (debit cards). However, this method has several restrictions that make it inappropriate for many settings. For example, it requires the use of a specially configured telephone that includes a card reader and requires the telephone system and video services system of the hospitality facility to be interconnected.

Therefore, despite the capability of prior art video services systems, an advancement of the art is needed. Specifically, prior art systems allow customers at all types of hospitality facilities to pay for services using a preapproved credit card recorded in the property management system customer portfolio. Likewise, they may pay for services at check-out. However, prior art systems do not enable customers to make point-of-sale payment for purchases from their rooms with credit or debit cards that are not preapproved or not stored in the property management system. In addition, even though currently available systems are capable of allowing customers to interact with the video services system and with computer generated graphics screens transmitted to and displayed on a television set in their room, they do not enable customers to utilize the video services system to interact with the necessary data bases to retrieve information, such as account balance, etc., therefrom. In addition, presently available systems do not enable the video services systems to compile information from a variety of data bases in order to select and transmit interactive graphics screens for display on the customers television set. These shortcomings limit the customers options and curtail their ability to purchase goods and services and limit the number and type of services that service providers can make available to customers.

Small facilities typically pose additional problems that are not addressed by the prior art. For example, a high percentage of customers who stay at small motels prepay for their rooms with cash. Because they pay with cash, these customers do not need to check-out, and the establishment's personnel have only the minimal, initial contact with the customers. Furthermore, because they have no credit card on file with the facility, if additional services are purchased, they must be purchased with cash at the front desk or from some type of vending system. Additionally, if a credit card is on file, the customer may prefer to use a different credit card, a prepaid debit card or a bank ATM card. Traditional video services systems are not designed to serve this market.

Hospitals also pose challenges that are not overcome by the prior art. For purposes of clarity for insurance reimbursement and for other reasons, hospitals must segregate billing for pay-per-view entertainment and other video system purchases from the rest of the hospital bill. For this reason, it is not desirable for a video services system installed in a hospital to utilize the hospital's property management system or personnel to collect payment for system services. In addition, video services systems for hospitals must be flexible enough to accept point-of-sale purchases and payment from more than one party because in a hospital, a given television could be utilized by patients, family members, friends and other persons. This could result in when, for example, a patient's family members decide to utilize pay-per-view services while a patient is undergoing or recovering from a surgical procedure. At a later time, the patient may refuse to pay the bill, claiming that he or she did not utilize the service. Likewise, patients in a hospital may spend much more time in their room than a business person at a hotel, but patients are much more likely to be interrupted, especially during the day, for tests or therapy.

Accordingly, because of the inflexibility of current systems, providers of video services for the hospital market potentially are exposed to a substantial loss of revenues through denial of personal charges.

It is generally acknowledged that hospitality facilities of all sizes and would benefit from the Convenience and capability of point-of-sale type, transactions and payment. These transactions satisfy customers impulse purchases of amenities and other services. Even more important, the hospitality establishment is no longer responsible for collecting the payments and or the loss of revenues when a customer refuses to pay. These conveniences and capabilities simply are not available with the present art.

Therefore, what is needed is a video services system which enables point of-sale payment for transactions via a video services system.

SUMMARY OF THE INVENTION

The foregoing problems are solved and a technical advance is achieved by a and apparatus for providing customers of hospitality facilities with the ability to access a variety of amenities and interact with the video system in order to enable point-of-sale purchase of and payment for goods and services with credit or debit card. In a departure from the art, a video services system of the present invention integrates numerous components that have not heretofore been integrated, including card readers, televisions, external data bases, and telephone networks. The resulting system provides customers with a payment system that is simple to use because customized audio, video and graphic prompts are generated based on information gathered from multiple locations, including direct customer input.

In a preferred embodiment of the invention, the principle elements of the system include a plurality of card readers arranged in a distributed configuration, a plurality of room terminals associated with the card readers, a radio frequency (RF) transmission network, and a systems control computer, which is connected to internal and external data bases. Each of the card readers is a standard reader and is utilized to enter billing data into the system. Card readers can also be used which read encrypted cards, such as bank cards or "ATM" cards and "smart" cards, which are cards with internal intelligence usually embedded on an EPROM. The card reader receives and transmits the information in a format that can be processed by the systems control computer. The card information can be temporarily stored in a buffer within the card reader or the room terminal or can be transmitted to the systems control computer via an open Circuit. Additionally, the card reader is capable of reading information stored in a magnetic stripe on conventional credit or debit cards.

The plurality of card readers, deployed in a distributed configuration, are each connected to a room terminal and to the systems control computer for the video services system via an RF transmission system. Generally, the connection between the room terminals and the systems control computer is over coaxial cable or, alternatively, fiber optic cable. In addition, instead of radio frequency transmissions, new advancements in the art allow information and video programming to be transmitted over a transmission network of the subject hospitality facility in a digital format. However, until the cost effective transmission of digitized video becomes widely utilized, the preferred embodiment, as disclosed herein, assumes that transmissions are in a radio frequency format. The use of digital transmission will have no impact on this invention.

The systems control computer is connected to a video source unit and the head end. Similarly, the systems control computer can be connected to a property management system of the facility and to a variety of on-premises and off-premises data bases. The functions of the systems control computer are controlled by microcoded instructions stored in the memory of the computer. The systems control computer stores and processes the billing data and other transaction information. Responsive to receipt of billing or interactive information from the customer and from various data bases, the systems control computer generates and transmits graphics, video, and/or audio prompts to be distributed and broadcast on the customer's television set. For example, if the customer has entered the number of an expired credit card, the data base will inform the systems control computer that the card is expired. The systems control computer generates and displays a graphic screen and plays audio prompts that state that the card is expired. Furthermore, prompts can be utilized to recommend that the customer use the card reader to enter the information from another credit card. In addition, messages can be generated that help explain available services, clarify how to access and utilize the various services, help the customer with the purchasing procedure and explain problems with credit or debit cards. Audio and video prompts also can be generated or controlled by the systems control computer and utilized to interact with the customer and respond to customer input. These prompts are transmitted by the systems control computer over the facility's internal RF distribution network. Because the systems control computer is connected to various credit, debit and ATM card data bases, the transaction can be recorded on the computer's hard disk and/or processed and recorded in the appropriate one of the aforementioned remote data bases.

In an illustrative embodiment, a card reading device comprising means to collect and store billing data is connected to a room terminal of a video services system by one of several different means. The room terminal typically is an interface between a head end/video unit of the video services system and a television located in the customer's room and controls reception of broadcast programs. In this embodiment, the room terminal also functions as an interface between the systems control computer and the card reader associated with the room terminal. When the room terminal is polled by the systems control computer or when the room terminal signals the systems control computer, billing data previously entered by the customer is transmitted to the systems control computer. The systems control computer then processes the billing data, and, based on the content and format thereof, accesses one or more data bases or card validation bureaus. Based on preprogrammed parameters and on information resulting from queries made to data bases, the systems control computer interacts with the customer by generating and transmitting graphics or display prompts or by providing entertainment and information services.

In alternative embodiments, the card reading device may be built into the room terminal, incorporated into the television set, or included as part of the remote control unit. The card reading device collects the billing information and transmits it to the room terminal, where it is stored until the room terminal is polled by the systems control computer. In addition, if the video services system utilizes asynchronous communications, the billing information will be transmitted from the room terminal to the systems control computer without first being polled. If the card reading device is a stand alone unit, incorporated into the television, or built into the room terminal, the billing information will be transmitted electronically. If the device is included as part of the remote control, the information will be transmitted via infrared signals or transmitted electronically, if the remote control is connected to the room terminal or television set over wire transmission means, as is typically the case in a hospital environment.

Alternatively, instead of being connected to the room terminal, the card reading device may be connected directly to the systems control computer. In this case, because the room terminal functions as an RF modem, the card reader would need a separate RF modem in order to transmit data to the systems control computer.

In another aspect of the invention, because the card reader is connected to the VSS and the systems control computer via a processor embodied in the room terminal, the card reader does not need to have much of the functionality typically included in a card reader. For example, instead of a keypad, customers enter information using a remote control. Similarly, instead of including a liquid crystal display (LCD) on the card reader, the graphics capability of the systems control computer, room terminal and TV are utilized. As a result, the card reader may be a simple magnetic stripe card reader with no additional functionality, which requires only 1 to 3 milliamps of power, as opposed to 5 to 10 volts of power for more complex card readers. Accordingly, the card reader may be powered using power from the TV and the room terminal, in which case a slightly more powerful power supply will be required to supply sufficient power for both the room terminal and the card reader.

In another aspect of the invention, the video services system can be utilized to accept and process debit cards for which customers have prepaid a certain amount of money. The systems control computer is capable of differentiating between debit cards and credit cards. The systems control computer is able to access a data base (which may be located off-premises, on-premises, or within the systems control computer) where information concerning the account balance of the debit card is kept. After the transaction is recorded, the systems control computer can receive, format, transmit as a screen and/or as an audio prompt the information concerning the remaining value of the debit card.

In another aspect of the invention, the systems control computer can access data bases and record a transaction so the customer receives discounts or credits toward future purchases. For example, some hotels, airlines and other businesses award points or credits based on the number of purchases made by a customer. The systems control computer can store a record of each customer transaction in its memory or can access an off-premises data base and record the purchase in customer files. Once the transaction is recorded, the systems control computer can transmit a screen to the customer's television informing him the number of the points or credits awarded based on the transaction. Similarly, the systems control computer can transmit prompts that give the customer the option to pay for the goods and services using award points and credits (for example, "press 1 to pay with a credit card, press 2 to pay with a debit card, press 3 to pay with Hotel Courtesy Points"). The systems control computer accesses the appropriate data base, assures that the customer has sufficient points or credits in the account to pay for the transaction, and then deducts the appropriate number of points from the account.

In another aspect of the invention, the systems control computer can be connected to a voice processing unit or can include voice processing capabilities. The systems control computer must also be connected to the facility's PBX. If the customer is having problems with the television or the written instructions, the systems control computer can call the customer's room and interact with him using synthesized voice prompts. For example, assume a customer uses the video services system to reserve seats for airplane travel but before the transaction is completed, the customer turns the television off, believing that the transaction is complete. However, the travel agency's computer is unable to process the customer's billing card information because the card has expired. Based on the identification number of the room terminal that was recorded and stored at the beginning of the transaction, the systems control computer can call the customer's telephone and play a prerecorded voice prompt requesting that the customer reenter credit card information. In this example the systems control computer has integrated several data bases, as well as the facility's telecommunications network, to customize audio, video, and graphic prompts to offer point-of-sale services based on intelligent processing of the known, required data.

In another aspect of the invention, the room terminal may include adequate processing capability to control projection and overlay features currently present in many television sets. Numerous television sets on the market are capable of overlaying symbols or icons (i.e., the channel number) on the television picture. The system can take advantage of this capability, thereby reducing the number of screens that must be generated and transmitted by the systems control computer. For example, if the room terminal detects that it has received incomplete data from a debit or credit card from a card reader built in to the remote control keypad, or the systems control computer makes the detection and informs the room terminal, the room terminal processor can utilize a protocol to command the television set to project an icon onto the television screen to assist the customer. For example, the message "Try Again" can be projected followed by an arrow (cursor) or a "bulls eye" projected on the screen near the infrared receiver. The symbols can be generated by the head end, the room terminal, or the television set. The systems control computer is also capable of generating and transmitting the symbols and icons for use with television sets that do not have such capability.

A technical advantage achieved with the invention is the ability to utilize the television set and the video services system to interact immediately with the customer by generating visual screens and audio and graphic prompts in response to the information input by a customer.

A further technical advantage achieved with the invention is the ability to access numerous data bases, pertinent to the information input by the customer, and formulate an appropriate response to be transmitted to the customer using audio, graphic and/or video prompts.

A further technical advantage achieved with the invention is the ability to utilize information received from the accessed data bases immediately to enable a customer to purchase and pay for goods and services utilizing credit, debit or ATM cards via the video services system.

A further technical advantage achieved with the invention is that it promotes and enables the point-of-sale purchase of and payment for goods and services with a credit or debit card immediately to be billed to the customer's account.

A further technical advantage achieved with the invention is the ability to integrate multiple data bases in order to issue discounts, coupons, or other point-of-sale incentives based on the goods and services purchased and the type of card used to effect the transaction.

A further technical advantage achieved with the invention is the ability to utilize protocols to command television sets to project messages, symbols or icons over broadcast programming.

A further technical advantage achieved with the invention is that, if there is a problem with the transaction, the video services system can call the customer utilizing the telecommunications network and, using digitized voice prompts, inform the customer concerning the problem.

A further technical advantage achieved with the invention is that, because the card reader is connected to the VSS and the systems control computer and therefore need not contain much of the functionality typically associated with a card reader, the card reader may be powered using power from the TV and room terminal.

BRIEF DESCRIPTION OF THE DRAWINGS

FIGS. 7A–7C and 8A–8B are examples of graphic screens that are generated by the systems control computer and transmitted for display on a television of the video services system of FIG. 1.

DETAILED DESCRIPTION OF THE INVENTION

Figure 1:
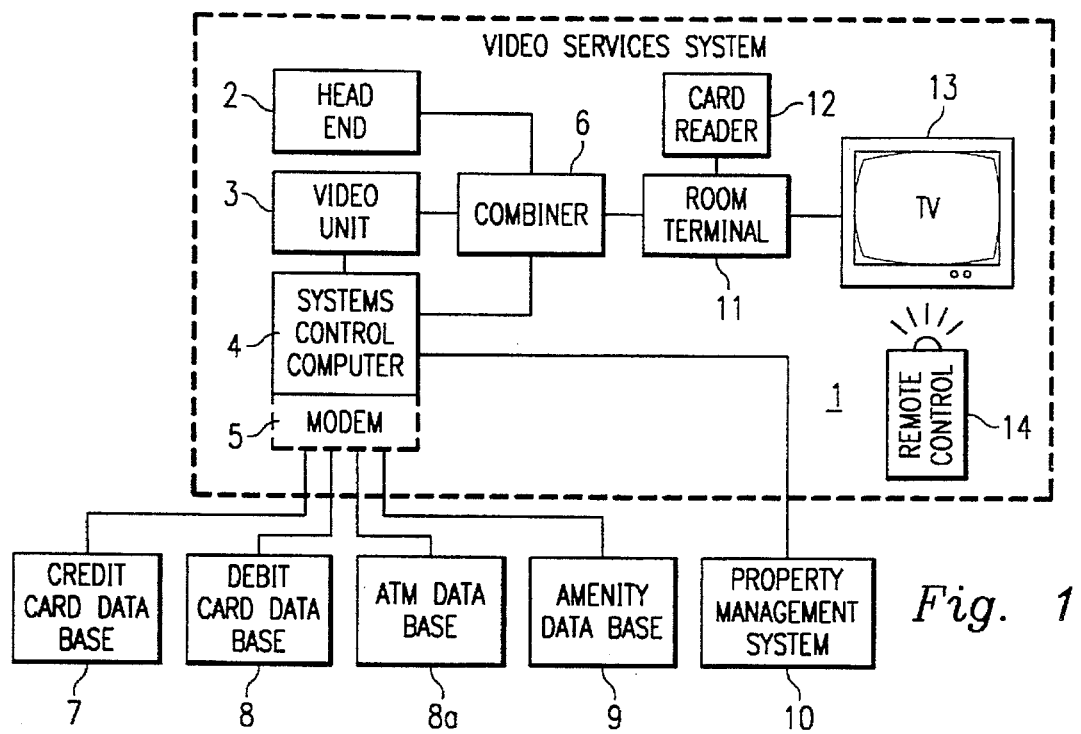
FIG. 1 is a block diagram of a video services system embodying features of the present invention.

Referring to FIG. 1, a video services system (VSS) embodying features of the present invention is designated by reference numeral 1. The VSS 1 comprises a head end 2, a video unit 3 and a system control computer 4 including a modem 5, interconnected via a combiner 6. A room terminal 11 is connected between a card reader 12, a television set (TV) 13 and the combiner 6. A remote control 14 is provided for controlling the operation of the TV 13 and for other purposes, which will be described.

The system control computer 4 is connected to a credit card database 7, a debit card database 8, an ATM data base 8a and an amenity database 9 via the modem 5 and is also connected to a property management system 10. This embodiment of the VSS 1 of FIG. 1 presupposes that information and programming are transmitted to or from the room terminal 11 and TV 13 in an RF format. This presupposition is not intended to limit the invention, it being understood that such signals may also be transmitted over the hospitality facility's distribution network in a digital format.

The head end 2 receives and distributes transmissions for the VSS 1 from cable television networks or satellite distribution networks and from local television affiliates (off-air broadcast). The head end 2 is comprised of a satellite receiver and decoder (not shown) or a cable television receiver and decoder (not shown) and is connected to a conventional broadcast distribution network of the hospitality facility comprised of trunk lines and feeder cable comprising coaxial cable or optical cable. The head end 2 also can include signal modulators (not shown) that are utilized to decode and modulate the transmission signals for retransmission. The head end 2 receives transmissions from providers of standard broadcast television and from cable television programming. These transmissions are decoded and retransmitted over the facility's broadcast distribution network. Customers access these transmissions with the room terminal 11 and the TV 13, with or without a remote control.

Customers also can choose to receive pay-per-view or on-demand programming transmitted from the video unit 3. The video unit 3 may comprise a plurality of standard video cassette players, a plurality of cassette player controllers, decoders, frequency modulators and a diplexer (not shown). The video unit 3 may also comprise digital-to-analog signal converters, as necessary. For scheduled pay-per-view movie service, the cassette players are preloaded with preselected video cassettes. Typically, pay-per-view movies are shown at scheduled times and all rooms in the facility have access to any pay-per-view transmission. However, it is well known in the art that the video unit 3 also can be configured to provide on-demand programming. With video-on-demand programming, the video unit 3 is constructed in such a manner that a selected movie is transmitted from a video cassette player to only the room terminal of the customer that requested the programming. Often, facilities that utilize this method of providing on-demand programming must provide a minimum of fifty or more cassette players for the video unit 3. In an alternative embodiment, in order to utilize significantly fewer video cassette players, video unit 3 can be comprised of a robotic device that removes the selected video tape from a storage rack and places it in an appropriate video cassette player for transmission to the customer who ordered the programming. This embodiment can be configured so that more than one customer can access the selected programming. Alternatively, instead of cassette players and player controllers, the video unit can contain a computer digital video server and compressed signal decoders. The programming would be compressed digital video signals stored on disk drives, tape, compact disks or other high volume computer storage medium that is or may become available. Typically, the video server will be a computer with extensive memory capability and will be located at the hospitality facility's premises. However, the video server computer can also be located away from the facility's premises.

The systems control computer 4 provides the logic support for the VSS 1 and comprises a processor for data processing capability, hard drive storage for storing control and program algorithms, and read only memory (ROM) and random access memory (RAM) for storing data and screens for interactive services. Ideally, the systems control computer 4 is a personal computer that utilizes an Intel 386 or a 486 processor chip and has adequate RAM and hard disk storage capacity (e.g., 32 megabytes of RAM and 245 megabytes of hard disk storage capability) to accommodate graphics capability. For larger establishments and for added processing capability, the systems control computer 4 may include multiple processors connected by an Ethernet local area network (LAN). In a preferred embodiment, the systems control computer 4 utilizes UNIX operating system software.

In addition to the aforementioned components, the systems control computer 4 comprises sound boards and multichannel graphics circuit boards and can include a speech processing circuit board to allow the systems control computer 4 to interface with the facility's telephone system via a private branch exchange (PBX) or a public switched telephone network (not shown). Such speech capability allows the systems control computer 4 to initiate telephone calls and interact with the customer and access data over the telephone network.

The systems control computer 4 is connected to the head end 2 and the video unit 3 with coaxial cable or fiber optic cable. The systems control computer 4 controls the video unit 3 functions and monitors the input and output signals of the head end 2 and the video unit 3. The systems control computer 4 can be connected to the video unit 2 directly and also via the combiner 6. Because it is connected to the video unit 3, the systems control computer 4 can be used to control video cassette player controllers (not shown) and activate the cassette players (not shown) to play and transmit the video programming. The systems control computer 4 functions similarly when a video server computer is utilized instead of video cassette players. In addition, the systems control computer 4 is capable of interacting with a customer by transmitting video programming used for advertising or used to instruct the customer as to how to utilize the VSS 1 for point-of-sale purchase of goods and services.

Alternatively, instead of being stored on a video tape in the video unit 3, the contents of the video used for advertising and point-of-sale instructions may be digitized and stored in the memory of a computer processor (not shown), which would typically be a separate processor connected to a file server via an Ethernet LAN. With advancements in digital compression techniques and storage capability, the digitized video information could also be stored in a mass memory device associated with the central processor of the systems control computer 4.

The systems control computer 4 generates graphics screens as well as video and/or audio prompts as a means to interact with customers. Generally, the screens comprise a plurality of information fields. Some screens include fields that require a global variable. The systems control computer 4 receives information from the room terminal 11, internal and external data bases 7–9. The systems control computer 4 utilizes the information by comparing it with preprogrammed templates stored in the computer 4. Based on the information, the computer 4 retrieves the appropriate screen (s). In addition, the computer 4 utilizes information it retrieves to insert information into fields that require a global variable, i.e., a field that requires a variable that has the same value regardless of where it is used or with what program it is used. Once the screen is completed, i.e., formatted, it is transmitted to the appropriate room terminal 11 and TV 13. Based on the response, the computer 4 can interact with the customer by generating additional screens. Likewise, digitized voice prompts and "sound tracks" can be stored, retrieved, and appropriately transmitted by the systems control computer 4.

The systems control computer 4 is connected to a plurality of external data bases 7–9. For connection to most data bases, the systems control computer 4 comprises a data modem 5 that is connected to public and private telecommunications networks via standard local twisted pair telephone lines (not shown). The modem 5 can be a 2400 baud, 9600 baud or some other baud speed data modem. Likewise the systems control computer 4 may be connected to the telecommunications network via a packet link (X.25) and/or can be connected via fiber optics transmission means. Using unique software algorithms in conjunction with templates, the systems control computer 4 queries the appropriate data base(s) based on the information input by the customer. The systems control computer 4 receives and formats information received from the data base(s) and generates appropriate graphic screens and/or audio prompts to interact with the customer. After receiving approval from the customer, the systems control computer 4 may complete the transaction with the credit card data base 7, debit card data base 8 or ATM data base 8a, or can record the transaction on its internal hard disk.

As shown in FIG. 1, the systems control computer 4 is connected via modem 5 to the credit card data base 7, the debit card data base 8, the ATM data base 8a and the amenity data base 9. The amenity data base 9 may comprise data bases for businesses such as restaurants and travel agencies. Data bases 7, 8, 8a and 9 may each include a plurality of data bases. Alternative to connection to a plurality of credit card data bases or debit card data bases, the systems control computer 4 can be connected to a data clearing house, which would include data from and have access to a plurality of data bases. The connection between the systems control computer 4 and the data bases 7–9 via the modem 5 may comprise a dedicated data link or may be switched on a per-call basis.

If the hospitality facility has a property management system, such as the property management system 10, the systems control computer thereto with a connected thereto with a standard RS-232 data link or by an Ethernet LAN The systems control computer 4 can also access and utilize the customer information stored in the customer's data portfolio. The systems control computer 4 can also access additional data bases internal to the computer (not shown), and other data bases (not shown) within the VSS 1 or the hospitality facility.

The systems control computer 4 is connected to a plurality of room terminals, such as the room terminal 11, via an RF network comprised of coaxial or fiber optic cable. Alternatively, the systems control computer 4 can be connected to the room terminal 11 via a digital network comprised of the same transmission means. Characteristically, in a hospitality facility, each of the guest rooms will have a room terminal, such as the room terminal 11, and a television set, such as the TV 13. The systems control computer 4 polls each of the room terminals in order to determine if a room terminal has data to transmit back to the computer 4. Alternatively, the room terminal 11 can signal the systems control computer 4 when it has data to transmit.

The systems control computer 4 also can utilize the polling of the room terminals to determine whether to bill a customer for video services. Some hospitality facilities allow the customer to watch a pay-per-view movie for a set amount of time without incurring a charge (e.g., 5 minutes). By polling the room terminal 11 and using an internal timing feature, the systems control computer 4 can determine how long a customer has been viewing a program on the TV 13. After a predetermined time period has elapsed, the systems control computer 4 processes a bill for the movie (or other good or service). Each room terminal is polled by the systems control computer 4 at intervals of approximately every two seconds, or faster, if desired. In alternative embodiments used in the industry, other methods of communication between the systems control computer 4 and the room terminal 11 that do not require polling are utilized. The invention should not be construed to be limited because polling is used as the preferred method of initiating communication.

The video unit 3, the systems control computer 4, and the head end 2 can reside in the same location within the hospitality facility, even in the same racks, or can reside in physically separate locations within the facility. In addition, the video unit 3 may reside at an off-premise location. Generally when the unit 3 is located off-premises, it is utilized to transmit video programming to multiple hospitality and hospital facilities.

As mentioned above, the systems control computer 4 can be connected to a variety of data bases. These data bases can be large mainframes owned and controlled by banks or credit companies (e.g., VISA or American Express). Alternatively, the data bases can be owned and managed by the individual hospitality facility, by a hotel chain from a central location, or by some other service provider, including the same service provider that furnishes video services for the hospitality facility. It is likely that data bases for prepaid debit cards, such as the data base 8, will be owned and managed by the facility or hospitality chain or by a video services service provider.

Debit card data base 8, for prepaid debit cards, contains files with debit card account numbers and account files which correspond to account numbers on customers' debit cards. The account files contain an accounting of the remaining value of the card. The systems control computer 4 can access the debit card data base 8 to verify that a particular customer's account has sufficient funds to pay for a requested transaction and to inform the Customer of the remaining balance. The transaction is immediately executed and completed by the debit card data base 8 and the systems control computer 4 is signaled when the transaction is completed. As an additional record of the transaction, the systems control computer 4 can transcribe and store a record of the transaction in its memory.

Typically, the credit card data base 7 is used only to verify that a particular customer's card is valid and can be used for the transaction. For credit card transactions, the additional information needed for billing the customer is contained on the magnetic stripe of the credit card. However, both the systems control computer 4 and the credit card data base 7 are capable of instantly completing the transactions. After verification that the credit card is a valid card, the systems control computer 4 executes the transaction by transmitting the purchase information to the data base 7. The purchase information, along with the account information, are recorded by the data base 7. The systems control computer 4 also can retain in its memory a record of the purchase and account information. Alternatively, instead of instantly executing the transaction with the financial institution, after determining that the credit card is a valid card, the systems control computer 4 can terminate the connection with the credit card data base 7 and record the transaction in its memory. At a later time, the systems control computer 4 is accessed by another off premises computer (not shown) or by a human attendant and a record of transactions is downloaded onto a physical medium, such as a floppy disk, for processing and payment collection. Alternatively, a facility may choose not to validate credit cards by accessing off-premises credit card data bases. As with the previously stated alternative, the systems control computer 4 is accessed by another off premises computer or by a human attendant and the transactions are downloaded and the credit cards are validated when processed for payment collection. This technique is known in the art as "post validation."

With an ATM card, the ATM data base 8a is accessed in order to transfer the funds from one account into another account. The ATM data base 8a contains a record of the particular customer's bank account. The systems control computer 4 accesses the record and transfers the funds for the expense from the file. A record of the transaction is also recorded onto the hard disk memory of the systems control computer 4.

The amenity data base 9 comprises a plurality of data bases from a wide range of businesses and service providers. The type of computer employed for the data base 9 can range from a personal computer utilized by a restaurant for reservations and take-out orders to a mainframe utilized by the airline industry for flight reservations.

The systems control computer 4 is also connected to the property management system 10, which contains a data base for storing a record of each customer's room bill (portfolio). The systems control computer 4 may be connected to the property management system 10 by a standard asynchronous serial port, in which case communication is accomplished via a standard RS-232 link. Alternatively, the systems control computer 4 can be connected to the property management system 10 by an Ethernet LAN. Generally, the property management system 10 is a mini computer such as an IBM AS 400. However, hospitality facilities are increasingly utilizing personal computer based, distributed processors interconnected by a LAN, such as the property management system 10. Among other functions, the property management system 10 maintains a customer portfolio that lists services and amenities used by the customer, the corresponding charges, and the total amount due at checkout.

The combiner 6 is utilized to combine RF signals from the various sources onto one coaxial cable. In the illustrated embodiment, the combiner 6 is utilized to combine RF signals from the systems control computer 4, the video unit 3 and the head end 2.

The room terminal 11 interfaces the video unit 3, the head end 2 and the systems control computer 4 with the TV 13. Generally, the room terminal 11 is a self contained unit, but it can also be a "smart tap" connected to the wall or reside within the TV 13. The room terminal 11 can have two or more external buttons or a full key pad, which the customer uses to choose programming and change television channels. Alternatively, the room terminal 11 has no external keys and the customer uses a remote control 14 and a channel changer (not shown) of the TV 13. The room terminal 11 can receive infrared signals from the remote control 14. If the TV 13 receives infrared signals, the room terminal 11 can receive the signals from the TV 13 and respond to those signals using an interface and copyrighted protocols. Each room terminal 11 is programmed with a unique room identification number that serves as an address for communication with the systems control computer 4.

The room terminal 11 is utilized to control reception of broadcast television and special pay-per-view and video-on-demand programs, information services and educational programming. In addition, the room terminal 11 controls use of interactive video services by providing a user interface to the systems control computer 4 and the system applications. Program signals are received by the room terminal 11 from the head end 2, the video unit 3, and the systems control computer 4 via the RF distribution system. The room terminal 11 is connected to the TV 13 by standard coaxial cable. The room terminal 11 transmits and receives frequency-shift-keying (FSK) signals having a 75 kHz shift over coaxial cable at a noninterfering frequency. Alternatively, video programming can pass directly through the room terminal 11 and the TV 13 receives the program transmissions via the RF distribution system. The room terminal 11 is connected to the RF distribution system, interfaces with the systems control computer 4, and maintains control of the reception of the transmissions by interfacing with an internal processor of the TV 13 through a series of protocols.

There are several polling methods known by those skilled in the art by which the systems control computer 4 and the room terminal 11 can initiate communications. The invention should not be limited by the use of one method of polling and communications instead of another. Typically, the systems control computer 4 will initiate the communication by transmitting a signal to the room terminal 11. The room terminal 11 responds by transmitting the requested data or by transmitting a signal indicating that it has no data for transmission. In the same manner, the computer 4 polls all the room terminals 11 one at a time. Alternatively, the computer 4 may transmit a universal request for data to all room terminals, which only respond to the systems control computer 4 if they have data to transmit. Various protocols and methods are utilized to prioritize the data received by the computer 4 from the room terminals. Finally, with some systems, the room terminals initiate the communication with the systems control computer by transmitting unsolicited signals and data to the systems control computer 4.

The card reader 12 can be one of a wide variety of types of card readers for credit and debit cards. The card reader 12 is connected to the VSS I via the room terminal 11. The card reader 12 can be built into the same unit as the room terminal 11 or the TV 13, but typically it will be a stand alone unit. Because the card reader 12 is connected to the VSS 1, credit and debit cards can be utilized instantly to pay for video programming and other amenities and services at the point of sale. In the preferred embodiment, the Card reader 12 is capable of reading data encoded on a magnetic stripe on the back of the credit or debit card. Typically, the stripe comprises a number of tracks, including a track that contains the customer's unique account number. For ATM cards, the card reader 12 must also be capable of reading encrypted codes. A card is swiped or inserted past reader heads (not shown) of the card reader 12 that read the data encoded on the stripe. The data is transmitted over a serial interface, such as an RS-485 interface, or, if the card reader 12 is installed within the same unit as the terminal 11, by an internal bus to the room terminal 11.

Unlike many card readers, the card reader 12 does not have to contain an LCD display. Instead, the systems control computer 4 and the TV 13 are utilized to generate and display interactive messages to the customer.

If for some reason the card reader 12 is unable to read the billing information (e.g., the magnetic stripe is worn out or the card is damaged), or simply as an alternative for the consumer, the card number can be entered manually using the keypad of the remote control 14, the room terminal 11, or the card reader 12.

The TV 13 is a standard television set. In an alternate embodiment, the card reader 12 may be mounted on the TV 13. The TV 13 may also be equipped to receive infrared signals from the remote control 14 or may be directly wired to the remote control unit 14, as would be the case with most hospital units. The room terminal 11 may also be incorporated into the TV 13. In addition, many modern television sets have the capability of projecting symbols or icons over the broadcasted programming. For example, in response to data received from the remote control unit 14, the TV 13 may be capable of projecting the number of the television channel over a corner of the program. The analysis of the data and the control over the projection of symbols and icons may be controlled by a processor within the TV 13 or by the room terminal 11.

The remote control 14 is a standard infrared remote control unit with numerical keypad. The remote control 14 is utilized to change channels, order goods and services, interact with the VSS 1, and, in connection with ATM cards, enter the a personal identification number (PIN). The remote control 14 may include the card reader 12. The remote control 14 may also be directly wired to the TV 13. Often in a hospital setting, the remote control unit 14 will comprise a single unit with a nurse call unit. This single unit is connected by wire both to a nurses station and to the TV 13. As an alternative to the remote control 14, the room terminal 11 can include a numerical keypad and other keys for choosing services and changing the television channel.

As an example, the customer responds to an offer to purchase services and products by passing a credit card or debit card through the card reader 12. Services and products can be offered to customers by a variety of methods. Advertisements for services and products can comprise graphic screens and/or audio prompts transmitted from the systems control computer 4 or can be transmitted from video tapes or digitized video stored at the video unit 3. Additionally, services and products can be advertised by printed material located in the hospitality facility rooms.

Card reader 12 reads the data from the magnetic stripe on the card and temporarily buffers the data. Once all the data is collected, it is transmitted to the room terminal 11 where it is stored. When the room terminal 11 is polled by the systems control computer 4, the room terminal 11 transmits the card data to the systems control computer 4 over a carrier frequency of, for example, 13 MHz. The data is reformatted by an RF modem internal to the room terminal 11 before it is transmitted.

The systems control computer 4 receives and temporarily stores the data. As will be described, various elements of the data are processed by algorithms and templates stored in the memory of the computer 4. For example, the computer 4 analyzes the billing data to verify that all the data was received. The computer 4 also compares the expiration date with the current date to insure that the card has not expired and compares the format of the account number with various templates of formats stored in memory to determine the type of card (credit, debit or ATM, Visa, MasterCard or American Express). If there is no matching format, the computer 4 determines that the card is unacceptable (a library card or gasoline card) as a billing card. While the systems control computer 4 is processing the billing data, it continues to poll other room terminals 11. If the computer 4 determines that the card is an ATM card, it must also request and receive a matching personal identification number (PIN) before it will proceed with the transaction.

The systems control computer 4 generates and transmits screens in response to the processing of data input by the customer. For example, if the systems control computer 4 determines that the swiped card has expired, the computer 4 would generate and transmit a screen to be displayed on the television 13 informing the customer that the card had expired and suggesting that he or she use another card. If the card requires the use of a PIN, the screen would request that the customer use the keypad to enter the PIN. The screen could also contain a global field, and the systems control computer 4 would insert the date when the card expired into the global field, for example, "Your credit card expired on__; please try another credit or debit card."

Audio prompts could also be utilized to repeat the prompt while the graphic screen is being displayed on the TV 13. Likewise, if the computer 4 did not receive all the billing information, it could generate a screen requesting that the customer use the card reader 12 or keypad to reenter the billing data. Alternatively, if the computer 14 includes a voice card and is connected to the facility's PBX or is connected to the public switched telephone network (not shown), the computer 14 could telephone the customer's room and play a digitized voice prompt informing the customer that the card reader did not receive all the information and the customer should try again.

The systems control computer 4 can also generate other screens responsive to the information received from the customer. For example, screens can be utilized to inform the customer that the billing data was not received and that he or she should reswipe the card, or that the card is unacceptable and that they should use a valid credit, debit or ATM card. In addition, it is possible that the systems control computer 4 received too much information or jumbled information because the customer swiped the card more than once or because the magnetic stripe on the card is worn out. The computer 4 can generate and transmit a screen and/or audio prompts telling the customer to swipe the card again—but only once, or try a different card.

The systems control computer 4 can process the billing data by accessing one or more of the of several data bases 7, 8, 8a to insure that the card is valid and that the account has sufficient funds to pay for the transaction. Once the connection with the data base 7, 8, or 8a is established, the computer 4 has the option to complete the transaction with the data base. The systems control computer 4 determines which data base to access based on the format of the card. The systems control computer 4 utilizes the modem 5 to access the credit card data base 7, the debit card data base 8, and/or the ATM data base 8a. Likewise, the computer 4 can use a serial link, such as an RS 232 link, or Ethernet LAN to access the property management system 10. Once the card has been validated, the systems control computer 4 can generate and transmit screens notifying the customer that the card was approved and that the transaction is being completed. With credit cards, the systems control computer 4 can authorize the credit card data base 7 to execute the processing of the transaction, or the systems control computer 4 can record the billing and transaction information so it can be down loaded and processed at a later time. With ATM and debit cards, the transaction is completed and the data base 8 or 8a account instantly reflects the transaction. In some instances, especially with debit cards, screens containing global fields could be generated and transmitted, in order to show the customer the funds remaining in the debit account. On property storage of the transaction for twenty-four hours will probably be required.

If the commodity being purchased is video entertainment (e.g., pay-per-view), then the systems control computer 4 sends a signal the room terminal 11 that enables the customer to view the programming. It should be noted that, with some systems, the signals for the programming are continuously transmitted to all room units, but are "blocked" from being viewed with the TV associated with each of the room units and are "unblocked" when the customer selects to purchase the programming. As an alternative, the hospitality facility could choose to allow customers to view an initial time interval of the programming without being billed. If this is the case, the systems control computer 4 would monitor the room terminal 11 and complete the processing of the transaction after the predetermined time period has elapsed. If the video unit 3 is a video-on-demand type unit, the systems control computer 4 will signal the video unit 3 to transmit the desired program to the channel allowed by the specific room terminal 11 and TV 13.

As another example, if a customer responds that he or she is interested in area restaurants or in the various amenities available within the hospitality facility (clubs, stores, restaurants, etc.), the computer 4 can contact the video unit 3 in order to activate an appropriate presentation, such as a short video of an audio and visual tour of area restaurants. The presentation may be in the form of a video residing in the video unit 3. Likewise, a video presentation can be digitized and stored in the memory of a central computer processor or on a CD-ROM disk. The computer processor or the CD-ROM players may be connected to the systems control computer 4 via an Ethernet LAN or may be connected directly. Also, the presentation can take the form of audio prompts and graphics screens stored in the memory of the systems control computer 4. In conjunction with the presentation, the computer 4 may also be utilized to take reservations. Audio and/or graphic screens would be used to prompt and solicit information and additional screens and audio prompts would be generated and transmitted based on the customer's response.

For example, because the systems control computer 4 is connected to restaurant data bases via the amenities data base 9, the computer 4 could query the restaurant data bases to determine what times were available for a table seating and place the reservation with the data base. Likewise, as described above, the VSS 1 could be used to order and pay for meals, especially take-out or delivery meals, from room service and area restaurants. Other goods and services may also be purchased in this manner. As mentioned above, the VSS 1 could be used to make reservations with companies such as hospitality facilities in other areas and airlines or to purchase commodities such as flowers or newspapers and to hold or pay for such reservations and commodities instantaneously using a credit, debit or ATM card and the card reader 12.

Because of the ability of the systems control computer 4 to generate prompts and screens that are interactive with the information provided by the customer, the computer 4 can provide the customer with the capability of ordering goods and services to be provided to a separate location. For example, a customer may wish to utilize the VSS 1 to purchase programming to be viewed by his children in a separate room within the same facility. Likewise, a patient in a hospital may choose to purchase programming to be viewed on another TV or a doctor may choose to purchase medical programming to be viewed by all her patients on a given floor.

Typically, the systems control computer 4 directs the delivery of video services to the customer based on the signals originating from the corresponding room terminal 11. Alternatively, the computer 4 can generate graphic screens that query the customer as to which room is to receive the selected video programming. The customer can use the remote keypad 14 to enter the room number of the receiving room. Once the systems control computer 4 receives the data from the room terminal 11, it directs the purchased programming accordingly.

Figure 2:
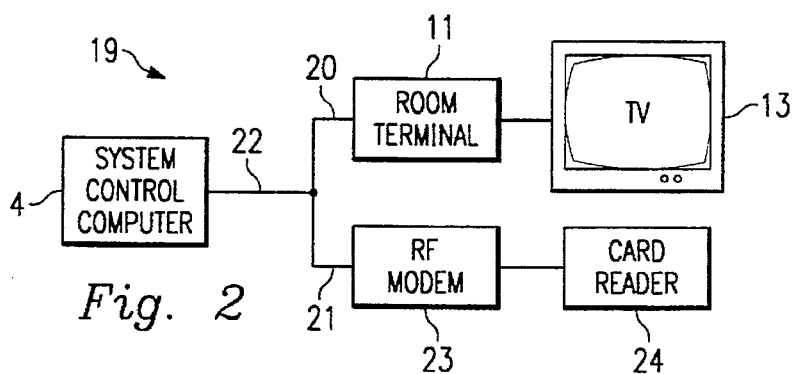
FIG. 2 is a block diagram of an alternative embodiment of the video services system of FIG. 1.

FIG. 2 illustrates an alternative embodiment of a portion of a VSS 19 wherein the card reader 12 is not directly connected or built into either the TV 13 or the room terminal 11, nor does the card reader 12 communicate with the room terminal 11 via infra-red signals. Although not shown, it should be noted that, similar to the VSS 1, the VSS 19 also includes a head end 2, video unit 3, modem 5 and a combiner 6. Likewise, although not shown, it should be understood that the VSS 19 is also connected to a plurality of data bases, such as the data bases 7, 8, 8a and 9.

In some instances, the hospitality facility will be designed in such manner that, for customer convenience or some other reason, the card reader 12 will be installed in a location that is separate from the TV 13 and room terminal 11. For example, in some hospitals, the patients' television sets are mounted on the wall across the room from the patients' beds. Many patients lack the physical ability to get out of bed and cross the room in order to use a card reader mounted on the television cabinet or room terminal. Card readers would have to be located on the patients' night table or somewhere else on or near the bed.

Instead of being directly connected to the room terminal 11, in this embodiment, the card reader 12 is connected directly to the facility's internal video services distribution network. Characteristically, the video services distribution networks for hospitality facilities comprise trunk lines and feeder lines of coaxial or fiber optic cable. In FIG. 2, coaxial cables 20 and 21 represent feeder lines that branch directly from a trunk, or primary feeder, line 22. The room terminal 11 and the card reader 12 are connected to the network by coaxial cables 20 and 21 respectively. Because of its direct connection to the distribution network, the card reader 12 also is connected directly to the systems control computer 4.

In this alternative embodiment, instead of utilizing the radio frequency (RF) modem capability of the room terminal 11, the card reader 12 has a separate RF modem 23. RF modem 23 can be built into the card reader 12 or can function as a stand-alone unit. If separate, the card reader 12 will be connected thereto via a standard serial interface. Alternatively, if information and programming signals are transmitted in a digital format, modem 23 will be a digital, rather than an RF modem. The card reader 12, or, if separate, the RF modem 23, will have an identification number unique from the room terminal 11, giving it a separate address. Accordingly, the RF modem 23 will be polled by the systems control computer 4 separately from the room terminal 11. Because it has a unique address and is polled separately, the systems control computer 4 differentiates between the data transmitted by the card reader 12 and the room terminal 11. Alternatively, the separate card reader and room terminal units can transmit their unique address with a leading header. In the memory of the systems control computer 4, the identification numbers for the card reader 12 and the room terminal 11 will be coordinated, wherein the systems control computer 4 can respond to information transmitted thereto by the RF modem 23 by transmitting appropriate interactive screens to the room terminal 11 and the TV 13.

As previously described, when a credit or debit card is swiped or inserted into the card reader 12, reader heads (not shown) read the data encoded on the magnetic stripe. Once the RF modem 23/card reader 12 is polled by the systems control computer 4, the information is transmitted down stream at a predetermined frequency, e.g., 13 MHz. The transaction is completed as described in connection with FIG. 1, with access to appropriate data bases 7, 8, 8a and 9 and the transmission of interactive graphic screens and/or audio prompts to the associated room terminal 11 and TV 13.

Figure 3:
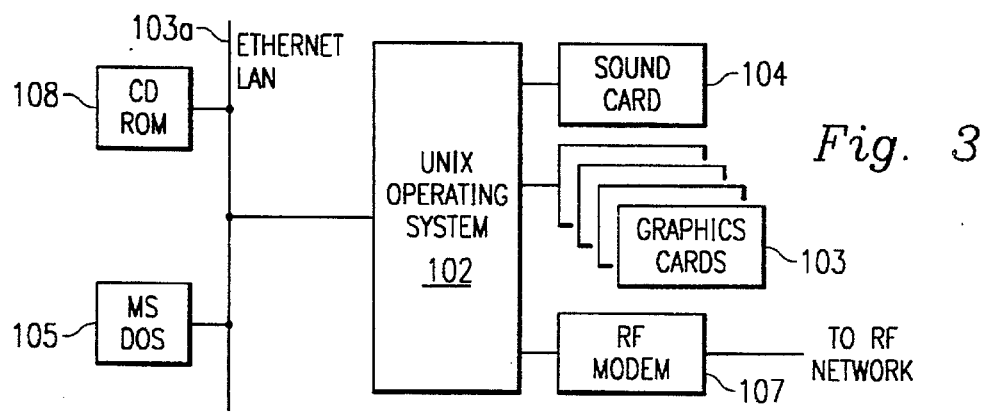
FIG. 3 is a block diagram of a systems control computer of the video services system of FIG. 1.

FIG. 3 illustrates a functional block diagram of a preferred embodiment of the systems control computer 4. Ideally, the computer 4 comprises an Intel 486 DX, 33 MHz processor (not shown), an SCO UNIX operating system 102, graphics cards 103 and sound cards 104. The systems control computer 4 may also include a voice response circuit board (not shown), such as the Natural Microsystems VBX/400, to be utilized as an interface to the facility's telephone system. A hard disk (not shown) of the computer 4 is utilized to store runtime files, various data bases, movie charges and credit information.

The operating system 102 may be an SCO Lite UNIX Operating System and custom application software (known as "Spectradyne Integrated Computing Environment").

The operating system 102 will typically support four graphics cards 103, each of which are typically capable of supporting four transmission channels. The graphics cards 103 can be standard graphics circuit boards, such as STB or MIT. Graphics produced by the graphics cards 103 generally are screens comprised of a plurality of information fields and can be either static or interactive graphics screens. If additional graphics capability is needed by the hospitality facility, additional UNIX operating systems and graphics cards 103 may be added and supported by a file server (not shown) over an Ethernet LAN 103a. The UNIX file server can serve a plurality of operating systems 102. In addition, the file server functions as the system manager and provides hard disk storage for the systems control computer 4. The systems control computer 4 may also include one or more sound cards 104, such as a single channel "Sound Blaster" circuit board. The sound cards 104 are utilized to provide verbal prompts and background sound and music for the graphic screens.

In addition, a plurality of MS DOS processors 105 and CD ROM interactive players 108 may be added to the systems control computer 4 and utilized to generate and transmit digitized static or full motion video screens that can be utilized for advertisements and other purposes. The CD ROM player 108 may be a standard, "off the shelf" CD ROM player. Each of the processors 105 comprises a mother board, a graphics card and Authorware and X Windows software programs and are capable of generating and transmitting graphics for only one transmission channel. For this reason, a separate processor 105 must be utilized for each transmission channel. The processors 105 are served by the file server 101 via an Ethernet LAN 103a.

The systems control computer 4 also comprises two modems. Modem 5 is described in FIG. 1 and is not shown in FIG. 3. The systems control computer 4 also utilizes an RF modem 107. In one embodiment, the RF modem 107 is located separate from the systems control computer 4 and is connected to the computer 4 via an RS 232 asynchronous serial port. The RF modem 107 can also be incorporated into the systems control computer 4. The RF modem 107 is utilized to convert the computer communications signals from digital signals to radio frequency signals. In an advancement in the art, the RF modem 107 can be a "smart" modem with its own processing capability. Instead of utilizing the computer 4 to initiate communications to the room terminals, such as the room terminal 11, the smart RF modem 107 may poll and communicate with the room terminals and connect the selected room terminal with the computer 4 only when status changes. The systems control computer 4 can support numerous peripheral elements, including a keyboard, SVGA or monochrome monitors, printers and front desk terminals. The keyboard and monitor can be used for maintenance and programming functions. The printers may be coupons. The fronting reports, bills, receipts and coupons. The front desk terminals allow the facility's personnel to input or output customer data.

The systems control computer 4 also can support voice processing capability. The systems control computer 4 can comprise multiple voice processing cards (not shown), such as the Natural Microsystems VBX 400. The voice processing boards are connected to the facility's private branch exchange (PBX) (not shown) or the public television network via standard copper twisted pair telephone lines. Alternatively, a separate processor (not shown), preferably but not necessarily a UNIX processor, with voice processing cards can be utilized and attached to the systems control computer 4 via an Ethernet LAN and connected to the PBX via standard copper twisted pair telephone lines. Even though it is receiving billing information from the room terminal over the VSS 1, the voice processing capability gives the systems control computer 4 an alternative means with which to communicate with the customer in case the primary means, i.e., the room terminal 11 and TV 13, is unavailable. For example, believing a transaction to be complete, a customer might turn off the TV 13 before the transaction is actually finished. The systems control computer 4 could utilize internal data to determine which room telephone corresponds to the address of the room terminal from which it received the billing data. The voice processing means gives the computer 4 the capability to outdial the customer's telephone, and, once the receiver is taken off-hook, play interactive voice messages and prompts to inform the customer of the issue and assist him or her in completing the transaction.

It should be noted that, instead of the embodiment described above, the systems control computer 4 can be self contained personal computer comprising graphics cards 103 and RF modem 107, which may be either "smart" or "dumb." This embodiment would have more limited capability and would be utilized primarily for smaller hospitality facilities.

Figure 4:
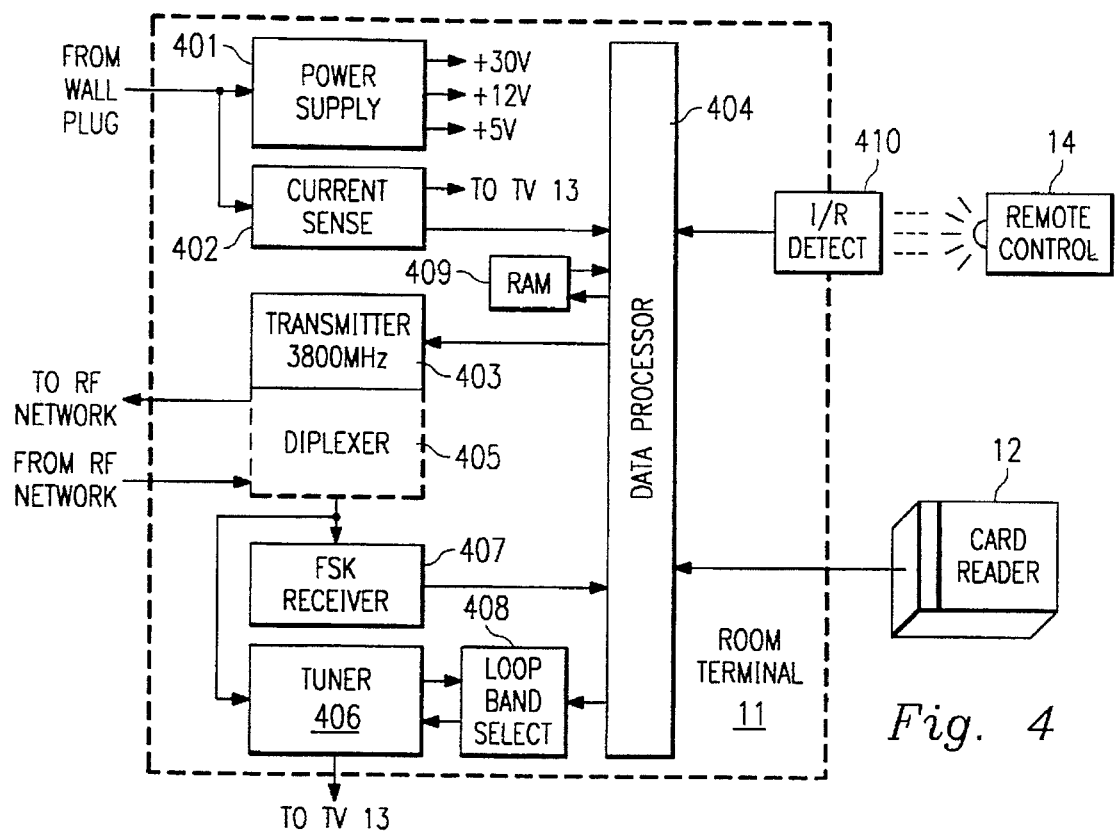
FIG. 4 is a functional block diagram of a room terminal of the video services system of FIG. 1.

FIG. 4 is a functional block diagram of the room terminal 11 with the remote control keypad 14 and the card reader 12. It should be understood that various functions and circuits of the room terminal 11 not directly related to the invention as disclosed herein are not shown or discussed herein. The room terminal 11 includes a power supply 401, which receives 120 volts of alternating current ("AC") from a wall plug and generates direct current ("DC") operating voltages at +5 volts, +12 volts and +30 volts to provide operating power for all the circuits within the room terminal 11. A current sense circuit 402 monitors the current drawn by the TV 13 (FIG. 1) and is utilized to determine whether the TV 13 is on or off. In a preferred embodiment, the current sense circuit 402 determines that the TV 13 is "off" if it senses that the TV 13 is drawing 15 watts of power or less and "on" if it senses that the TV 13 is drawing 45 watts of power or more.

A transmitter 403 is utilized by the room terminal 11 to transmit signals to the systems control computer 4. When the transmitter 403 receives data and the appropriate signal from a data processor 404, the resulting signal is output to the systems control computer 4 by means of a diplexer 405.

The diplexer 405 provides capability simultaneously to transmit and receive signals over the RF carrier network. Television or video signals originating from the head end 2 or the video unit 3 are redirected by the diplexer 405 to a tuner 406. Also, graphic screens and short video clips transmitted from the systems control computer 4 are directed to the tuner 406. However, polling commands and other signals and commands transmitted by the systems control computer 4 are directed by the diplexer 405 to a frequency shift key (FSK) receiver 405.

When the diplexer 405 receives a polling command or other communications signal from the systems control computer 4, the signal is transmitted to the FSK receiver 407. Typically the FSK receiver 407 receives a 115.25 MHz FSK modulating carrier signal from the systems control computer 4. The receiver 407 generates receiver data signals based on the data received to be transmitted to the data processor 404.

The tuner 406 generates the television signal output to the television set. The tuner 406 receives the command from the data processor 404 to convert the desired input frequency for the TV 13. The signal is then transmitted from the tuner 406 to the TV 13. A loop band select 408 generates a tuning voltage signal. Tuning information from the data processor 404 is input to the tuner circuit by the loop band select 408.

The data processor 404 receives inputs from and controls almost all other circuits comprising the room terminal 11. The data processor 404 is a processor chip which has adequate processing capability to process billing data received from the card reader 12. Characteristically, the billing data is temporarily stored in a nonvolatile random access memory (RAM) 406. Data is read from the RAM 409 and transmitted to the transmitter 403 when requested by the systems control computer 4 (i.e., when the room terminal 11 is polled by the computer 4).

In addition, the data processor 404 receives and processes signals input from the remote control keypad 14 and the card reader 12. The data processor 404 reformats these signals to be transmitted over the RF network and then temporarily stores the signals in the RAM 409. When the diplexer 405 receives a polling command, the signal is received by the FSK receiver 407. The FSK receiver 407 notifies the data processor 404 that the unit 11 has been polled and that data can be transmitted to the systems control computer 4. The data processor 404 transmits the billing data or other data from RAM 409 to the transmitter 403. The data processor 404 also transmits a command to the transmitter 403 to transmit the information to the systems control computer 4.

The remote control keypad 14 is a standard remote control unit comprised of a numeric keypad and other keys that are utilized to change television channels, adjust the television's audio volume, and enter other information. As previously described, the room terminal 11 may also comprise a keypad (not shown) that can be utilized by customers as alternative or additional data input devices to the remote control keypad 14. Such a room terminal keypad would be connected to the data processor 404 by a data bus. Alternatively, the keypad also could be placed on the card reader 12, rather than the room terminal 11. The remote control keypad 14 may also comprise a joy stick or keys utilized for playing video games. The remote control keypad 14 transmits data to the room terminal 11 via infrared signals.

An infrared detector 410 detects infrared signals transmitted by the remote control keypad 14. Signals received by the infrared detector 410 are transmitted to the data processor 404, which differentiates between tuning or volume control commands that will be utilized internally to be executed by the room terminal 11 and control the television 13 and communications that are subsequently transmitted to the systems control computer 4.

The card reader 12 is connected to the room terminal 11 via a 485 serial interface. Numerous other types of card readers also could be used. For example, a card reader that has the added capability of reading encrypted ATM bank cards can be used. The system could utilize a card reader that has the capability of reading "smart" cards, which are cards that include an integrated circuit chip or an EPROM containing account status (including the remaining value of the card). Also, a card reader with its own internal data processor can be utilized. The internal data processor could compress the billing data before the transmission or format the data to be transmitted in a nonserial format. Each of these capabilities would be useful when utilizing retrofitted room terminals 11 that were developed and installed in hospitality facilities before this invention. For example, an older room terminal 11 may not have a processor with capacity to receive and store all the billing data. In this case, a processor contained within the card reader 12 could compress the data or transmit the data in several separate transmissions with smaller amounts of data being transmitted.

Because "help prompts" for informing the customer whether all the data was received from the card can be transmitted to and displayed on the TV 13, it is not necessary for the card reader 12 to contain an LCD for indicating to the customer that the card swipe was properly executed and all the data was received from the magnetic stripe.

Additionally, card reader 12 can be embodied in the room terminal 11. In this embodiment, the card reader 12 is connected to the data processor 404 by an internal bus (not shown) The card reader 12 receives power for its circuits from the power supply 401. Also, the remote control keypad 14 and the card reader 12 can be combined as one unit. The remote control keypad/card reader 14/12 would read information on the magnetic stripe of the card and transmit it to the infrared detector 410 via infrared signals. If the unit was wired to the TV 13, as would be the case in a hospital setting, the information would be transmitted over a connecting wire. The data processor 404 would determine, by special header information, or by the amount of information received, i.e. forty bits of information instead of one or two, that it was receiving credit or debit account information and that this information must be reformatted and then transmitted to the Systems control computer 4.

Figure 4A:
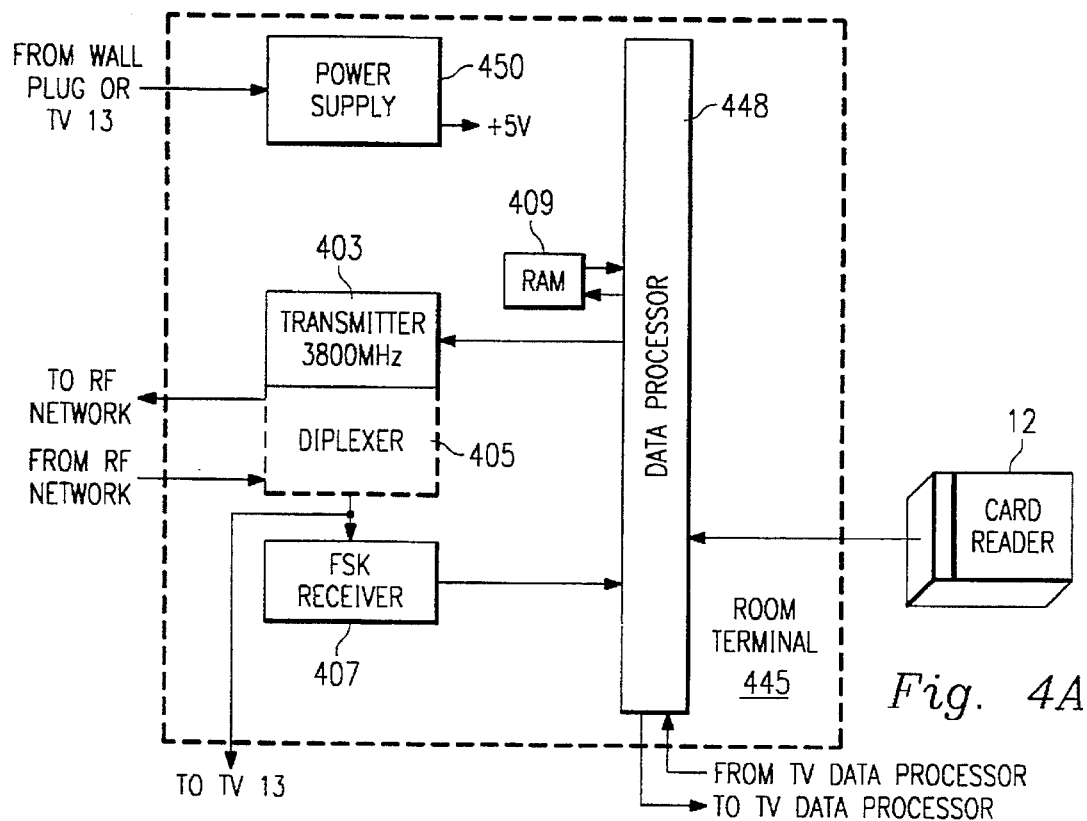
FIG. 4A is a functional block diagram of an alternative embodiment of the room terminal of FIG. 4.

FIG. 4A is a functional block diagram of an alternative embodiment of the room terminal 11, designated by reference numeral 445. Similar to the room terminal 11, the room terminal 445 includes the transmitter 403, diplexer 405, FSK receiver 407, RAM 409 and data processor 448, but does not include current sense circuit 402, tuner 406, loop band select 408 or infrared detector 410.

Many TVs now have internal data processors and infrared receivers and incorporate much of the same capability as the room terminal 11. Because of the increased capability of the TV 13 and duplicated functionality, it has become common in the art for a video services system, such as the VSS 1, to utilize room terminals with decreased functionality but with a data processor, such as the data processor 448, that is capable of interacting, via protocols, with the processor of a TV. Data processor 448 is connected to the processor (not shown) of the TV 13 via an RJ 11-type interface (not shown). Four of the six wires of the RJ 11 interface respectively carry data from the processor 448 to the TV 13 processor, data from the TV 13 processor to the processor 448, infrared data from an infrared receiver (not shown) of the TV 13 to the processor 448, and clock information from the TV 13 to the processor 448. A fifth wire is connected to electrical ground and a sixth wire is unconnected.

Additionally, instead of the power supply 401, the room terminal 445 includes a power supply 450, which receives an input of only 250 milliamps of power and outputs +5 volts. Because of the low power requirements of the room terminal 445, it can receive power from a wall plug or from the TV 13. If receiving power from the TV 13, the room terminal 445 can receive power via the sixth wire of the RJ 11 interface or via a separate wire.

Likewise, the card reader 12 can receive power from the room terminal 445. As with the embodiment shown in FIG. 4, the card reader 12 may be incorporated into the room terminal 445 and the card reader 12 circuits may be hard wired to the power supply 450. If, as shown in FIG. 4b, the card reader 12 is a stand-alone unit, an additional wire will be utilized to connect the card reader 12 to the power supply 450. According to the functionality of the card reader, the circuits for the card reader 12 can require from 1 to 10 volts of power. Because it is connected to the VSS 1 and the systems control computer 4 via the processor 448 of the room terminal 45, the card reader 12 does not need much of the functionality to be provided by a standard card reader. For example, instead of a keypad, customers enter information with the remote control 14 (FIG. 4a). Similarly, instead of containing graphics capability or a liquid crystal display (LCD), the capability of the systems control computer 4, room terminal 445 and TV 13 are utilized. Generally, a card reader with a keypad, LCD and compression capability requires 5 to 10 volts of power. In contrast, a simple magnetic stripe card reader with no additional functionality will require as little as 1 to 2 milliamps to read the magnetic stripe and transmit the data to the data processor 448. Accordingly, if the card reader 12 is using power provided by the TV 13 and the room terminal 445, a slightly more powerful power supply 450 will be required to supply sufficient power for both the room terminal 445 and the card reader 12.

For example, a card reader with a key pad and compression capability will require 5 to 10 volts of power. A simple magnetic stripe card reader with no additional functionality will require as little as 1 to 2 volts of power. Accordingly, a more powerful power supply 450 will be needed to supply sufficient power, depending on the needs of the card reader 12.

In the embodiment shown in FIG. 4A, an infrared receiver (not shown) may be incorporated into the TV 13, or may comprise a stand-alone unit, instead of comprising a part of the room terminal 445. The data processor 448 and the TV processor are connected to a shared data circuit and have access to the data received from the TV's infrared receiver. For example, when television channel selection information, or any other information, is input via the remote control keypad 14, the TV's infrared receiver communicates the information directly to the data processor 448 and to the processor of the TV 13. According to the encoding of the signals, the appropriate processor receives the data and the other processor ignores the data. In a like fashion, information input into the TV's infrared receiver to be transmitted to the systems control computer 4 would also be transmitted to the data processor 448 and discarded by the TV processor. Using various algorithms and tables stored in a memory of the processor 448, the processor 448 would reformat and temporarily store the information to be transmitted in the RAM 409, as described above, then transmit it to the systems control computer 4.

Some TVs are capable of creating and broadcasting images to be superimposed over the broadcast programming. Often, these images are numbers that represent the television channel and are utilized to inform the customer. Alternatively, these images can be created by the systems control computer 4. It is common in the art for a processor, such as the data processor 448, also to control the projection of these superimposed images. According to a feature of the present invention, the data processor 448 is able to utilize special images and icons, stored in a memory of the TV 13, to assist the customer in using the remote control keypad 14/card reader 12.

For example, the data processor 448 recognizes, by a unique header or by the volume and format of information being received, that it is receiving credit card information. The data processor 448 issues a command to the TV 13 processor to project an image, such as an arrow, cursor, or "bulls eye," showing the customer where to point the remote control keypad 14 card reader 12. The projected image would stay on the screen until all the information was received (or until a predetermined amount of time elapsed). Other icons and messages also can be utilized. For example, if the processor 448 determines that not all the credit card information was received, the commands the commands the TV 13 processor to project the image "Try Again" onto the TV screen.

As has been previously indicated, the hospitality facility's distribution network can be digital instead of RF. If the distribution network is digital, the room terminal 11 would contain the necessary functions to decompress, decode and demodulate the digital signals. In addition, the transmitter 403, diplexer 405 and receiver 407 will receive and transmit digital signals instead of RF signals.

Figure 5:
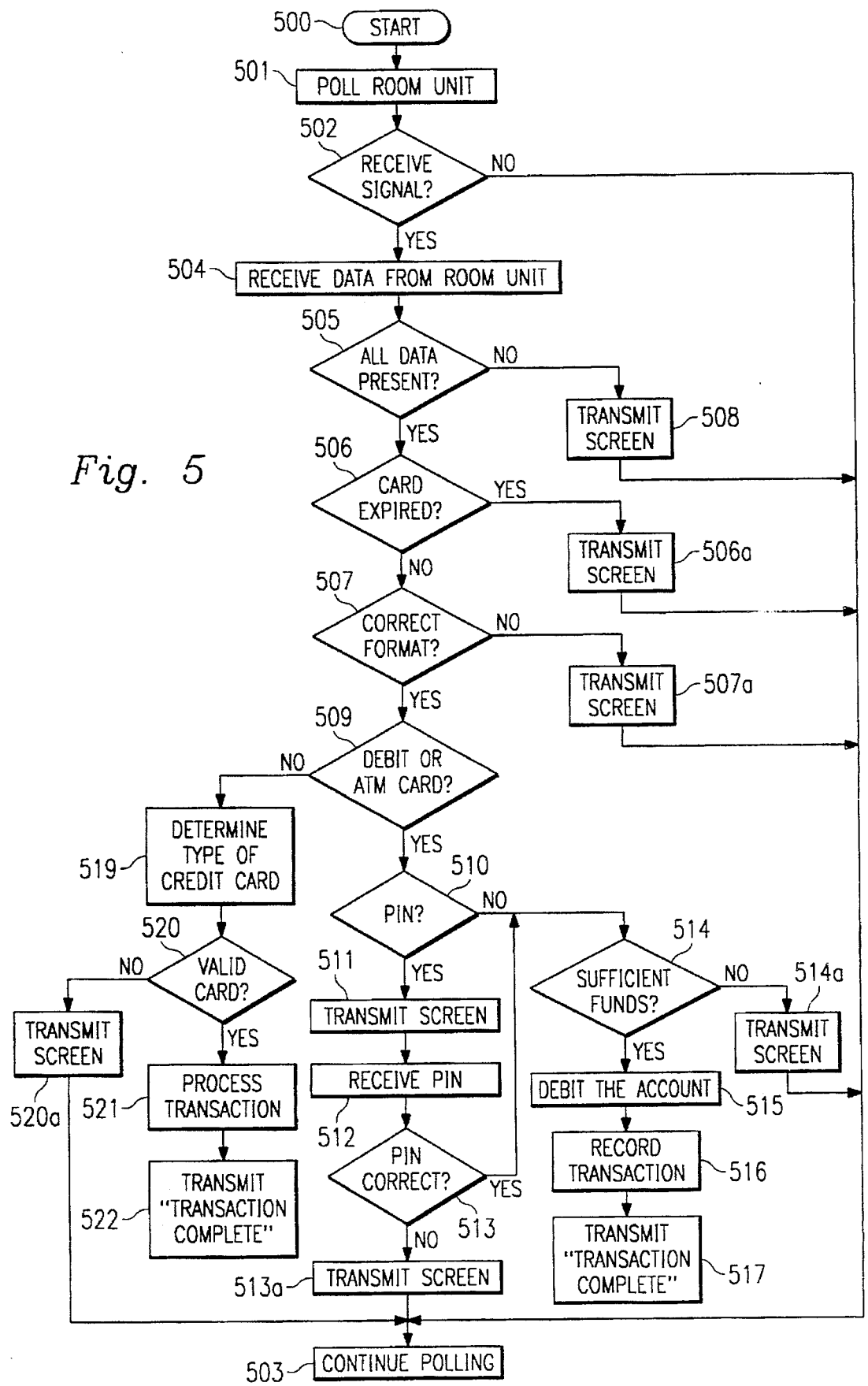
FIG. 5 is a flow chart of the operation of the systems control computer.

FIG. 5 is a flow chart of the operation of the systems control computer 4 and demonstrates the interaction of the systems control computer 4 with the card reader 12, remote control keypad 14, data bases 7–9, property management system 10, the room terminal 11, and the customer to provide point-of-sale payment for services and products. It should be noted that the systems control computer 4 can process simultaneous transactions; therefore, it continues to poll other room terminals while processing data received from the room terminal 11. As described herein, the communication between the room terminal 11 and the systems control computer 4 may also be initiated by the room terminal 11.

Execution begins in step 500 and immediately proceeds to step 501. In step 501, the systems control computer 4 polls the room terminal 11 by transmitting protocol request signals to determine if the room terminal 11 has data to transmit to the computer 4. Data momentarily stored by the room terminal 11 in the RAM 409 may include billing data that has been entered by the customer using either the card reader 12 or the remote control unit 14.

Once the signals have been transmitted, execution proceeds to step 502, in which a determination is made whether a response signal has been received from the room terminal 11, indicating that the room terminal 11 has data to transmit to the systems control computer 4. If the room terminal 11 responds with a signal indicting no status change or does not respond to the polling protocol, execution proceeds to step 503. In step 503, the systems control computer 4 continues to poll other room terminals (not shown) in step 501. In this manner, the systems control computer 4 has the capability to poll all the room terminals 11 in the hospitality facility within approximately two seconds.

If in step 502 the systems control computer 4 receives a signal that the room terminal 11 has data to transmit, execution proceeds to step 504. In step 504, the systems control computer 4 receives the billing data from the room terminal 11 that has been stored in the RAM 409. In a preferred embodiment the signal that the room terminal 11 has data to transmit (step 502) may actually be transmitted as part of the data stream. Alternatively, the transmission of actual data can serve as the signal. Execution proceeds to step 505, in which algorithms are used to compare the received data with templates stored in the memory of the computer 4. If a credit card is used, the billing information generally will include the account number and the expiration date. The information also can include the name and address of the card holder. If a magnetic stripe debit card is used, the billing information will include the account number and could also include a code designating the identity of the hospitality facility, or an encrypted code, if it is an ATM card. If all of the expected data is not present, the data is scrambled or jumbled, or there is too much data present, the computer 4 assumes that the card reader 12 was unable to read and transmit all the data because the magnetic stripe on the card was corrupted or that the customer is using the card reader 12 improperly or the customer could have entered the credit or debit card several times in rapid succession and the data became jumbled and execution proceeds to step 508.

In step 508, the systems control computer 4 generates a screen that has been stored in memory, or causes another processor to generate a screen, and transmits the screen to the room terminal 11 and the TV 13. The text on the screen informs the customer that the billing data was not received and instructs the customer how properly to operate the card reader 12. In addition, a screen or audio prompt can recommend that the magnetic stripe on the credit or debit card is worn out and that the customer should either manually enter the account number and expiration date with the remote control key pad (or some other key pad such as a key pad on the room terminal 11) or use another card. After transmitting the graphic screen in step 508, execution returns to step 503, in which the systems control computer 4 continues polling other room terminals. As previously indicated, the systems control computer 4 can process simultaneous transactions and also continues to poll other rooms while this transaction is in process.

If in step 505 all the data is present and in the correct format, execution proceeds to step 506, in which the expiration date of the card is compared with the actual date according to the computer's internal clock to determine whether the card has expired. If the card has expired, execution proceeds to step 506a. In step 506a, the systems control computer 4 generates a screen that has been stored in memory and transmits the screen to the room terminal 11 and the TV 13. The text on the screen informs the customer that the card has expired and recommends that the customer use another credit or debit card. The screen can contain a global variable field and the expiration date of the card is inserted into that field; e.g., "Your VISA card expired on___. Please use another credit or debit card." After transmitting the screen, execution returns to step 503, in which the systems control computer 4 continues polling other room terminals 11.

If the card has not expired, execution proceeds to step 507, in which a determination is made whether the format of the billing data is correct. The systems control computer 4 contains templates of formats for the credit cards accepted by the hospitality facility (e.g., VISA, American Express) and templates for ATM cards and for any debit card being utilized by the hospitality facility. If a determination is made that the data does not match one of the stored templates, the computer 4 assumes that the card is of a type that is not accepted by the facility (e.g., a petroleum company credit card or a library card) and execution proceeds to step 507a, in which the systems control computer 4 generates a screen that has been stored in memory and transmits the screen to the room terminal 11 and the TV 13. The text of the screen informs the customer that the card is not an acceptable card and recommends that the customer use another credit card or purchase a debit card.

If the card is of a correct format, execution proceeds to step 509, in which the systems control computer 4 compares the format of the account number to templates stored in the memory to determine whether the billing information indicates that the card is a debit card or an ATM card. If so, execution proceeds to step 510, in which a determination is made whether a PIN is required. For example, if the card reader 12 detected and transmitted an encrypted code, then the card is an ATM card and customer entry of a PIN is required. If a PIN is required, execution proceeds to step 511, in which the systems control computer 4 generates a screen that has been stored in memory and transmits the screen to the room terminal 11 and the TV 13. The text of the screen transmitted in step 511 requests the customer utilize the remote control keypad 14 to enter the PIN.

After transmitting the screen, execution proceeds to step 512, in which the systems control computer 4 receives the PIN information. If a PIN is not entered by the customer, the information is not available to be transmitted to the systems control computer 4 and the computer continues by polling other room terminals. As an alternative, after the initial screen is transmitted, an additional screen can be transmitted that contains four global variable fields. As the entered numbers are received by the systems control computer, they can be placed in the fields and transmitted back to the customer's television set. In this manner, the customer can verify that he or she has entered the correct PIN. Usually, PINs are transmitted in an encrypted format. The systems control computer 4 has the ability to decrypt the PIN, if need be, for transmission back to the TV 13 and still transmit the PIN to the database in its encrypted format. After the PIN has been received, execution proceeds to step 513.

In step 513, a determination is made whether the PIN is correct. The PIN entered by the customer is compared with the encrypted code. If the two sets of information do not match, execution proceeds to step 513a and a screen is generated for transmission to the room terminal 11 and the TV 13 to inform the customer that the PIN is incorrect and the customer should repeat the process. The screen can also recommend that the customer purchase another debit card, use a credit card, or use some other means to pay for the transaction, such as billing the transaction to the room or using "credits" or "points" (e.g., American Airlines Advantage Miles or ITT Sheraton ClubPoints). After transmitting the screen in step 513a, execution returns to step 503 in which the systems control computer 4 continues polling other room terminals.

If in step 513 the PIN is correct or if in step 510 a PIN is not required, execution proceeds to step 514 in which the systems control computer 4 queries the appropriate data base 8 or 8a to determine whether the account contains sufficient funds to pay for the transaction. The data bases 8 and 8a may be an off-premises data base that services multiple facilities, or even an entire chain of hospitality facilities or may be administered by a financial institution. If the data base 8, 8a is an off-premises data base, the systems control computer 4 utilizes the modem 5 for the query. Alternatively, the data bases 8 and 8a may be located within the hospitality facility. If located within the facility, the billing account information on the magnetic stripe of the card can contain a facility code field that would be used to assure that the card was purchased at that facility, rather than another facility, and is authorized for use. It is also possible that the data base 8, 8a will be located within the systems-control computer 4 or the property management system 10.

If in step 514 it is determined that account (debit or ATM) does not have sufficient funds to pay for the transaction, execution proceeds to step 514a. In step 514a, the systems control computer 4 generates a screen for transmission to the room terminal 11 and the TV 13 to inform the customer that the debit card account has insufficient funds to pay for the transaction. The screen can also recommend that the customer purchase another debit card, use a credit card, or use some other means to pay for the transaction such as billing the transaction to the room or using "credits" or "points" (e.g., American Airlines Advantage Miles or ITT Sheraton ClubPoints). Screens can also be generated and transmitted that provide account information from any of these data bases. After transmitting the screen in step 514a, execution returns to step 503, in which the systems control computer 4 continues polling other room terminals 11.

If in step 514 a determination is made that the account has sufficient funds to pay for the transaction, execution proceeds to step 515, in which the amount of money needed for the transaction is subtracted from the account (e.g., $5.00 for a pay-per-view movie and $7.00 for a pizza are subtracted from a $15 prepaid debit account or bank account). The action of subtracting the funds from the account takes place at the data base 8, 8a away from the systems control computer 4, unless the data base 8, 8a is located within the systems control computer 4. Execution then proceeds to step 515, in which the systems control computer 4 is notified by the data base 8, 8a that the transaction has been debited. The computer 4 can record the transaction on hard disk memory as a separate record of the transaction. Execution then proceeds to step 517, in which the systems control computer 4 generates a screen that is transmitted to the room terminal 11 and the TV 13. The text on the screen informs the customer that the transaction has been processed. In addition, a record of the transaction can be formatted by the systems control computer 4 and the data transmitted to a printer, via an I/O port, for printing a paper record of the transaction for the customer. The systems control computer 4 may also receive data from the data base 8, 8a indicative of how much money is left in the account. The screen transmitted in step 517 may then include a global variable field and the data from the data base is inserted by the systems control computer 4 into that field; e.g., "You have $__ left on your card (or "in your bank account")."

Returning to step 509, if a determination is made that the information is not in the format of a debit or ATM card, then the card must be a credit card, as all other types of cards would have been eliminated by that point. Accordingly, execution proceeds to step 519 in which a determination is made as to what type of credit card, i.e., American Express, Visa, or MasterCard, has been swiped. This determination is made by comparing the format of the data received from the room terminal 11 to templates stored in the memory of the systems control computer 4. Once the type of card is determined, execution proceeds to step 520, in which the systems control computer 4 queries the appropriate credit card data base 7, using the modem 5 to access a public telephone network (not shown) for the type of card (e.g., a VISA data base for a VISA card). In step 520, the systems control computer 4 transmits the account information to the data base 7 and receives a response from the data base 7. Based on the response, a determination is made whether the credit card is a valid card, i.e., whether the card has been approved or not approved (stolen, deactivated, or debt in excess of limit) for utilization. If in step 520 a determination is made that the card is not a valid card, execution proceeds to step 520a.

In step 520a, the systems control computer 4 generates a screen for transmission to the room terminal 11 and the TV 13 to inform the customer that the credit card is not valid and to recommend that the customer use another credit or debit card to pay for the transaction. After transmitting the screen in step 520a, execution returns to step 503, in which the systems control computer 4 continues polling other room terminals.

If in step 520 a determination is made that the card is valid and approved for the transaction, execution proceeds to step 521. In step 521, the systems control computer 4 will either record the transaction on its hard disk or complete the transaction with the credit card data base 7, depending on the configuration of the computer 4. If the computer 4 is configured to record the transaction, then, if using a dial-up link, the communication link with the credit card data base 7 is released and the billing information is recorded on the hard disk of the computer 4. At a later time, the billing information is downloaded from the computer 4, using the modem 5 or a data I/O port, so that it can be processed for billing and collection. Alternatively, instead of releasing the communication link with the credit card data base 7, the systems control computer 4 can transmit a signal requesting the credit card data base 7 to process the transaction by immediately debiting the customer's account. After the transaction is completed, if utilizing a dial-up connection, the systems control computer 4 releases the communication link with the credit card data base 7. In addition, a record of the transaction can be formatted by the systems Control computer 4, the data can be transmitted to a printer (not shown) via an I/O port (not shown) and a paper record can be printed for the customer.

After the transaction is recorded, execution proceeds to step 522. In step 522, the systems control computer 4 generates a screen that is transmitted to the room terminal 11 and the TV 13. The text of the screen informs the customer that the transaction has been processed.

It should be noted that instead of automatically determining whether the information input is from a credit, debit or ATM card, the systems control computer 4 can query the customer with graphic screens and/or audio prompts in order to predetermine the type of the billing mechanism; e.g., "Press 1 to pay with a credit card; press 2 to pay with a debit card; press 3 to bill to your room; press 4 to use hotel bonus points." After a determination that the customer will use a credit card, prompts can be utilized to determine the type of credit card; e.g., "Press 1 for VISA; press 2 for American Express; press 3 for Discover."

In addition, the systems control computer 4, as described herein, also enables customers to bill transactions to their room. In this case, instead of utilizing a credit or debit card and the card reader 12 to transmit billing information to the computer 4, the customer would use the remote control unit 14 (or some other keyboard or means of inputting single or multi digit information) to respond to questions posed by screens generated by the systems control computer 4. For example, the systems control computer 4 could generate the following message on the TV 13 screen:

> Press 1 on your remote control to bill the movie to your room; If you want to purchase the movie with a credit card or debit card, insert the card in the card reader now.

Figure 6:
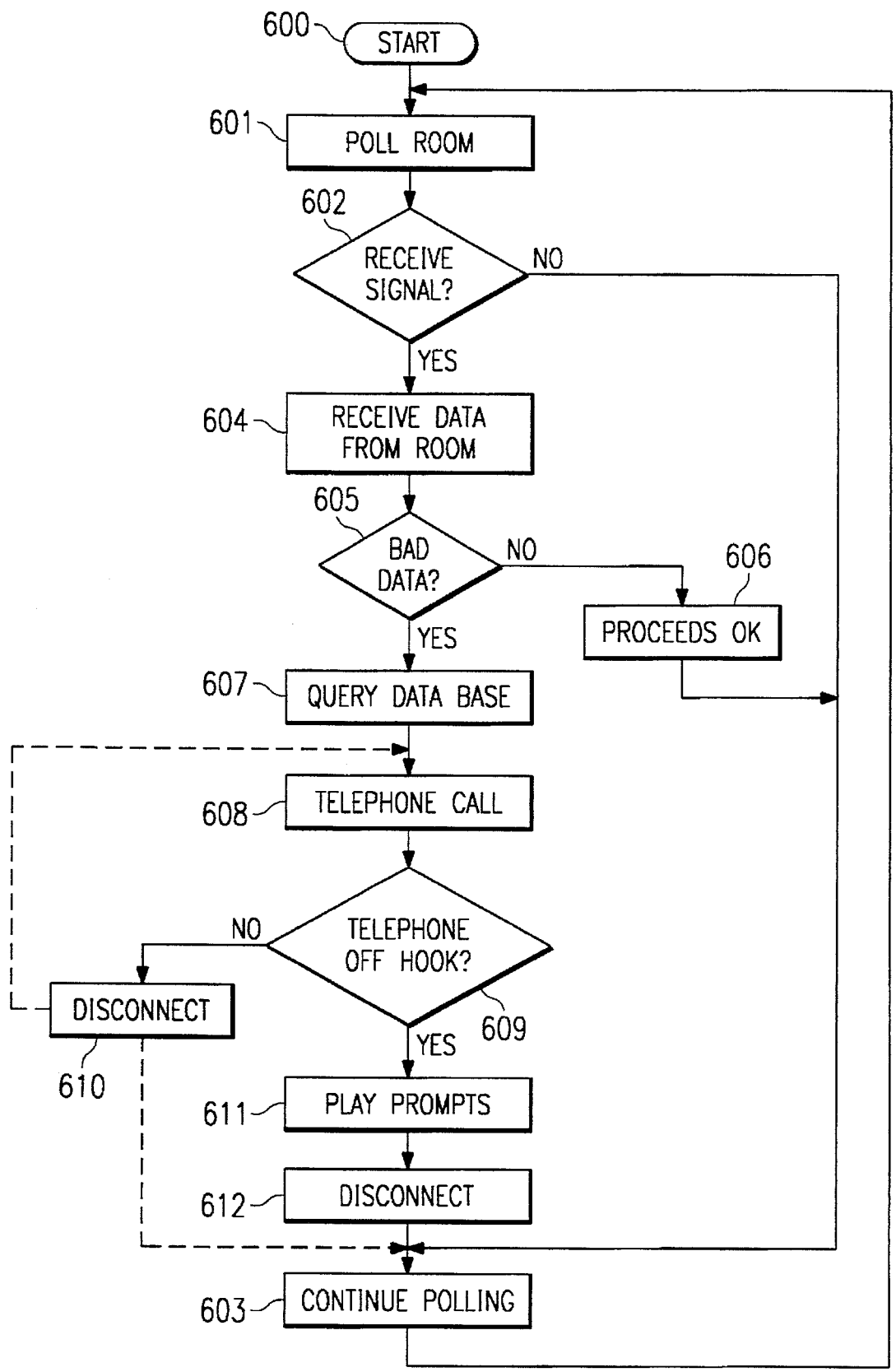
FIG. 6 is a flow chart of logic executed by the systems control computer for utilizing a telephone network to communicate with a customer.
Figure 7A:
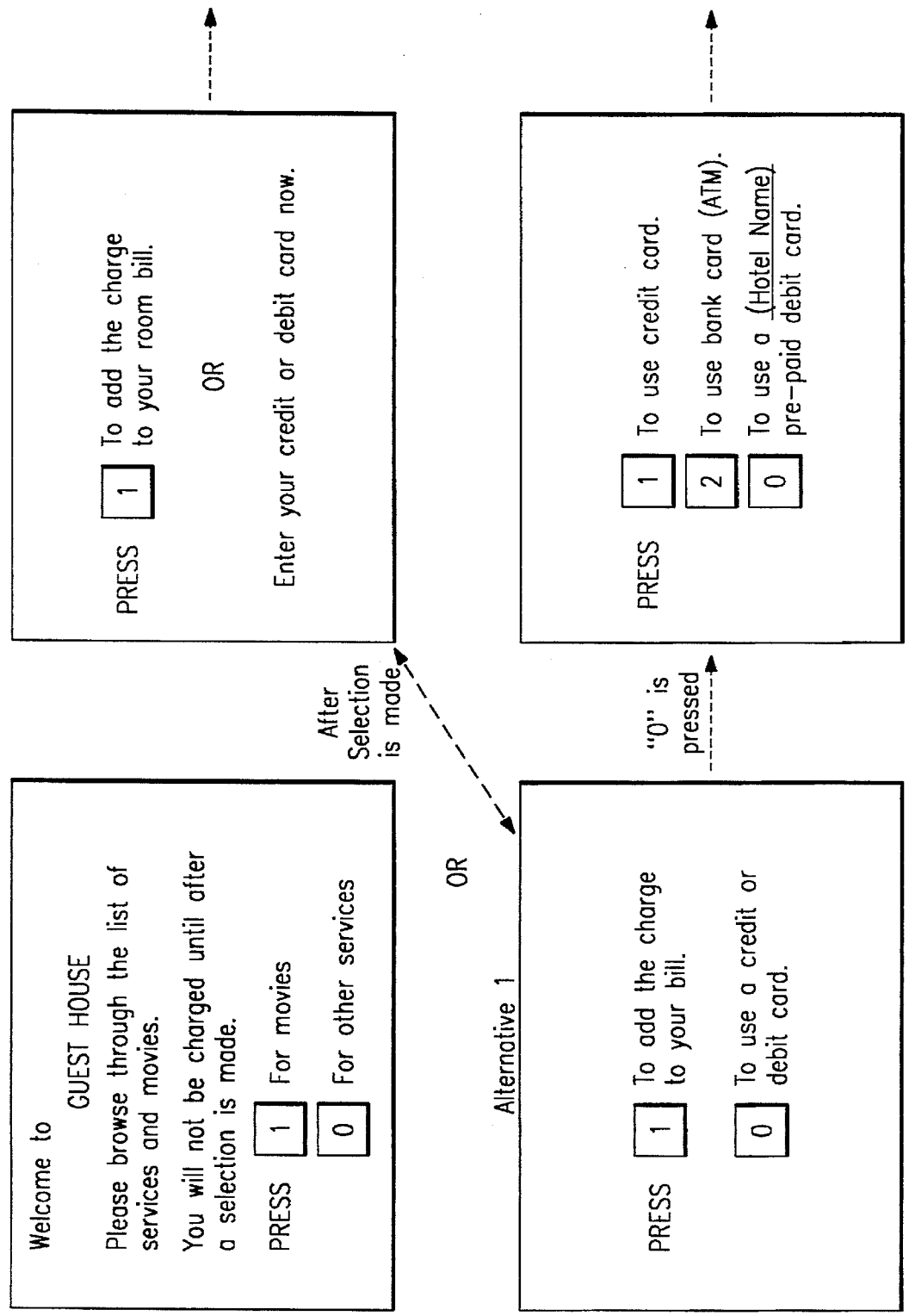
Figure 7C:
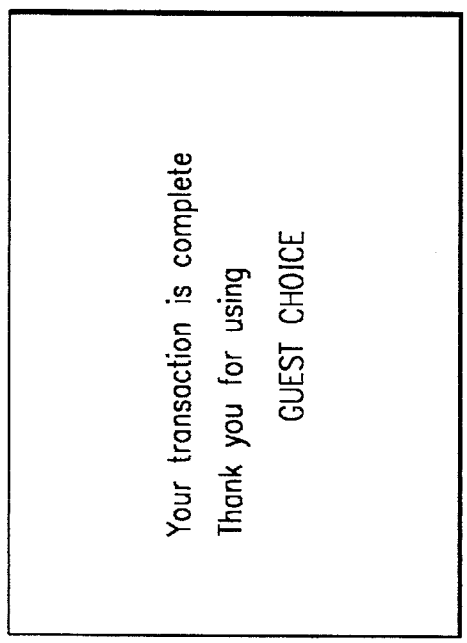
Figure 7C:
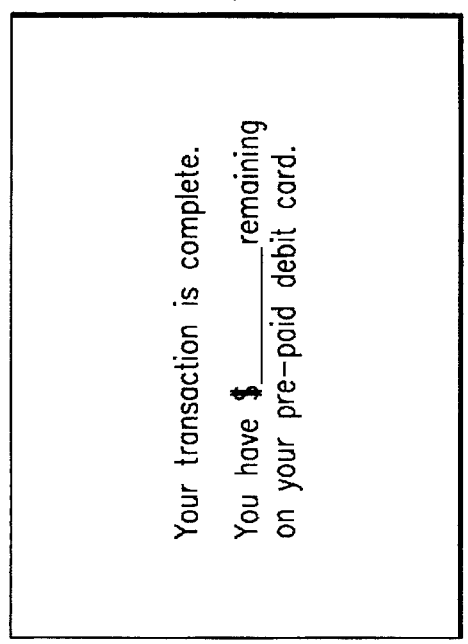
Figure 7C:
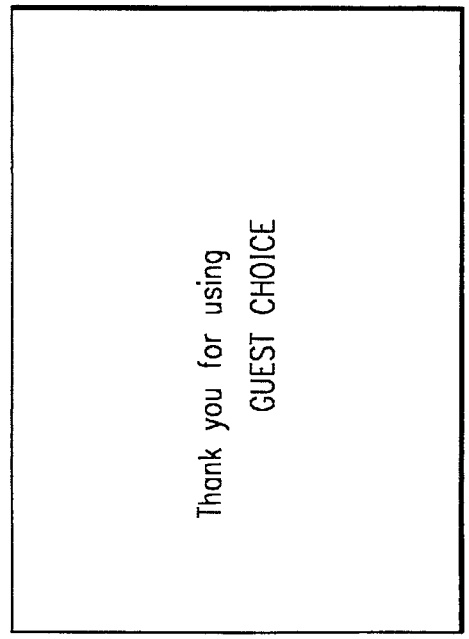
Figure 8A:
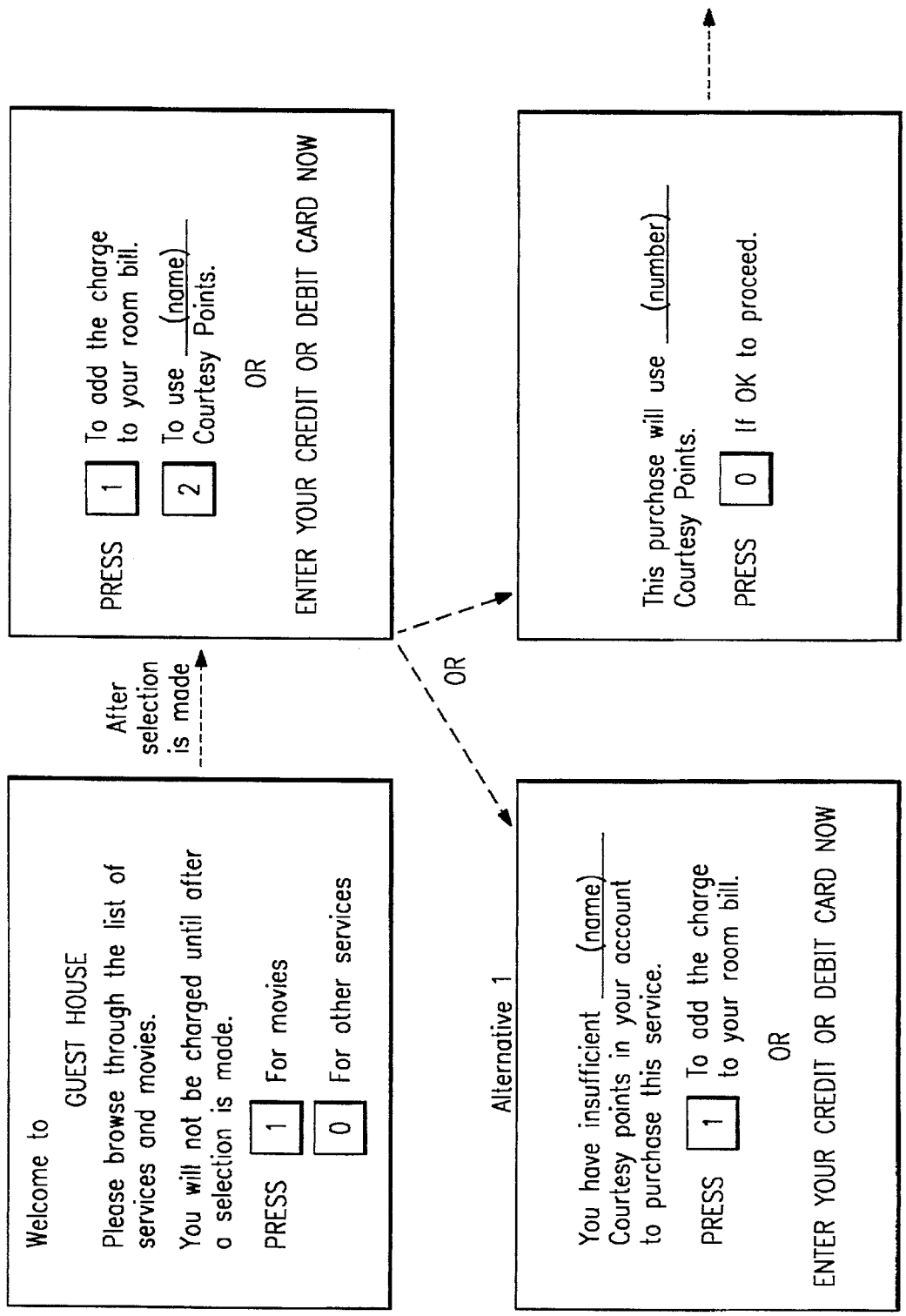
Figure 8B:
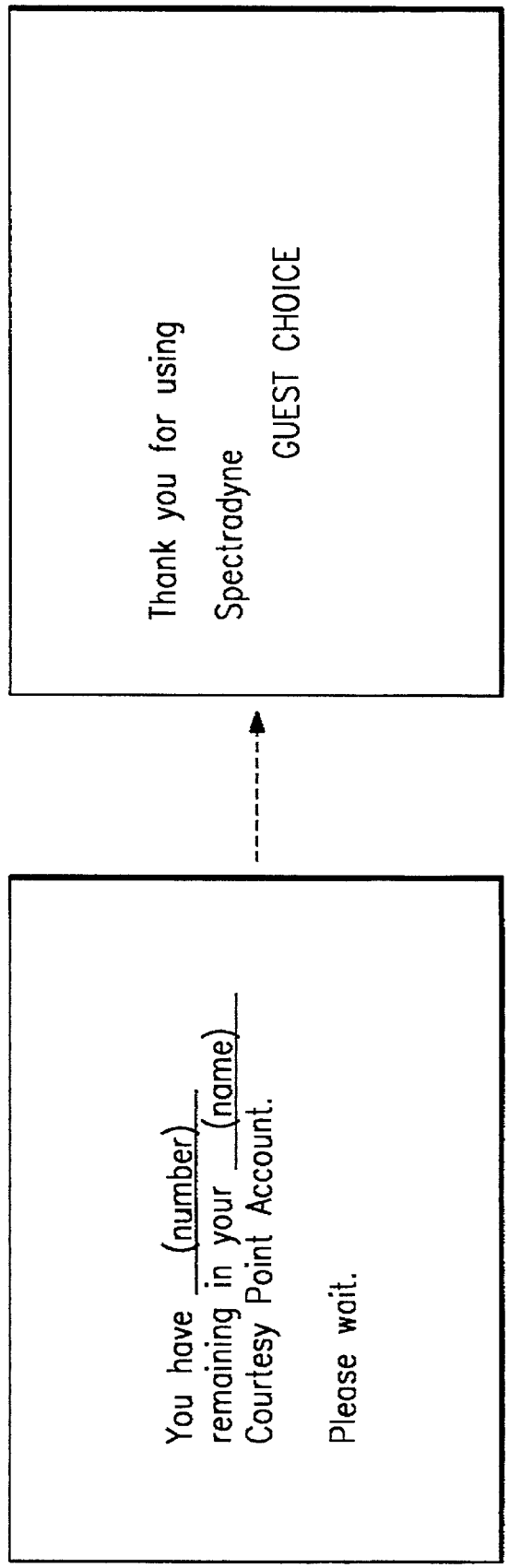

FIG. 6 illustrates a flow chart of the operation systems control computer 4 for an alternative embodiment in which the computer 4 uses the hospitality facility's telephone network to communicate with a customer who is utilizing the VSS 1. By connecting the systems control computer 4 to the facility's PBX (not shown) and telecommunications distribution network (not shown), telephone messages can be used in conjunction with the audio, video and graphic messages that are delivered via the VSS 1 to communicate and interact with customers. The execution of steps 600 through 604 proceed the same as steps 500 through 504 in the flow chart in FIG. 5. It should be noted, however, that after polling the room terminal 11 in step 604, the systems control computer 4 retains the identification number of the room terminal 11 in its memory. The identification number also serves as a polling address for the room terminal 11.

Execution then proceeds to step 605. Step 605 is a compilation of steps 505, 506 and 508 of the flow chart of FIG. 5. In step 605, data received from the room terminal 11 is processed and a determination is made whether the data is incorrect in any regard, i.e., whether all the data is present (step 505), whether the card has expired (step 506) and whether the format of the card is correct (step 507). If a determination is made that the necessary data is present, the format is correct, and the card has not expired, execution proceeds to step 606. Step 606 is a compilation of steps 509–522 of FIG. 5 and execution of step 606 proceeds identically to execution of steps 509–522. However, if a determination is made in step 605 that the data is not complete, the format is incorrect or that the card has expired or cannot be approved for the transaction, execution proceeds to step 607.

In step 607, the systems control computer 4 queries an appropriate data base in order to determine the telephone number of the customer. This data base typically resides in the systems control computer 4 and includes tables stored with the room telephone numbers that correspond to the room terminal 11 identification numbers. The data base also can reside in the property management system 10 or as a separate data base (not shown). As part of the protocol communication between the systems control computer 4 and an external data base, the systems control computer 4 transmits the identification number of the room terminal 11 to the data base. The data base responds by transmitting the corresponding telephone number back to the systems control computer 4.

Execution proceeds to step 608, in which the systems control computer 4 places a telephone call, using a voice processing card or a separate processor with voice processing capability that is connected to the systems control computer 4 via an Ethernet LAN, to the telephone number supplied by the data base. Characteristically, the telephone call is routed through the facility's PBX to the customer's room telephone. However, if the facility does not have a PBX, the telephone call can be routed through the public switched telephone network to the customer's room telephone.

Execution proceeds to step 609, in which a determination is made whether the customer has answered the telephone by taking the telephone off hook. If it is determined that the telephone line is busy or if the telephone continues to ring for a predetermined number of times (e.g., six times), indicating that the telephone will not be answered, execution proceeds to step 610, in which the computer 4 disconnects the telephone call. Assuming that the computer 4 can be and has been programmed to place a predetermined number of subsequent telephone calls in an attempt to reach the customer, after the computer 4 disconnects the telephone call in step 610, execution will return to step 608. Alternatively, after the computer 4 disconnects the telephone call in step 610, execution may return to step 603.

However, if in step 609 a determination is made that the telephone has been answered, execution proceeds to step 611. In step 611, appropriate voice prompts are played by the systems control computer 4 for the customer answering the telephone. For example, if the systems control computer 4 does not receive all the credit card data, it could play a prompt requesting that the customer swipe the card again or enter the credit card account number manually using the remote control keypad 12 (or the room terminal 11 keypad).

In addition, the prompt could explain to the customer how to properly use the card reader 12.

Execution then proceeds to step 612 in which, after the computer 4 has played the voice prompt one or more times the, computer 4 disconnects the telephone call and execution returns to step 603.

FIGS. 7A–7C and 8A–8B illustrate exemplary graphic prompts which might be generated by the graphics cards 103 (FIG. 3) of the SCS 4(FIG. 1) and displayed on the TV 13.

It is understood that variations may be made in the present invention without departing from the spirit and the scope of the invention. For example, the remote control 14 could comprise a radio frequency, rather than an infrared, transmitter. In addition, the VSS 1 could reside in a digital environment. Also, the video unit 3 could be located other than on the premises of the hospitality facility and connected to the VSS 1 via the local telephone network.

For example, in a preferred embodiment the room terminal 11 receives and forwards data input to the systems control computer 4. The computer 4 analyzes the data and formulates a response to be played on the television 13. It is possible that, in some instances, the data can be analyzed by the room terminal's 11 data processor 404 or 448 and the computer 4 can be bypassed. The room terminal 11 can utilize icons and graphics screens stored in the television 13 processor to respond to the customer. For example, the room terminal 11 can determine that it did not receive sufficient billing data from a credit card. The terminal 11 can command the television 13 processor to generate and project the appropriate message on the television screen, such as "try again," or the like. The computer 4 still would be utilized for more complex processing tasks.

Although illustrative embodiments of the present invention have been shown and described, a latitude of modification, change and substitution is intended in the foregoing disclosure, and in certain instances, some features of the invention will be employed without a corresponding use of other features. Accordingly, it is appropriate that the appended claims be construed broadly and in a manner consistent with the scope of the invention.

What is claimed is:

1. A method for reactive customized prompting for enabling a user at a hospitality location having a television to access and pay for video services and amenities, the method comprising the steps of:

entering billing information using a card reader or a remote control keypad;

selecting an amenity using said keypad;

storing and processing said entered billing information to facilitate payment for said amenity and presentation of said amenity on said television; and responsive to said processing, generating user prompts for display on said television, wherein contents of said user prompts are prescribed by results of said processing.

2. The method of claim 1 wherein said storing and processing comprises:

transmitting said entered billing information to at least one data base; and preventing presentation of said amenity until said at least one data base returns an authorization signal.

3. The method of claim 1 further comprising responsive to said processing, issuing audio user prompts to said user with said television.

4. The method of claim 3 wherein said audio user prompts and said user prompts correspond with each other to convey consistent information to said user.

5. The method of claim 1 further comprising entering user information in response to said prompts displayed on said television.

6. The method of claim 5 further comprising generating additional user prompts responsive to said entered user information.

7. The method of claim 1 wherein said billing information comprises a debit card number or an automatic teller machine (ATM) card number and associated personal identification number (PIN) and an account balance, the method further comprising automatically deducting an amount associated with said amenity from said account balance.

8. The method of claim 1 wherein said billing information comprises a credit card number and information regarding purchases made by said user, the method further comprising adding purchase information associated with said amenity selection to said billing information.

9. The method of claim 1 further comprising:
validating said entered billing information;
responsive to said entered billing information being valid, returning an authorization signal; and
preventing presentation of said amenity until said authorization signal is returned.

10. The method of claim 1 further comprising using power from said television to power said room terminal.

11. The method of claim 10 further comprising using power from said television to power said entering means.

12. The method of claim 1 further comprising responsive to said entered billing information, displaying on said television selected ones of a plurality of icons stored in a memory of said television.

13. Apparatus for enabling a user at a hospitality location having a television to access and pay for video services and amenities, the apparatus comprising:
means for entering billing information;
means for selecting an amenity;
a room terminal directly connected to said television and further connected to said entering means, said room terminal for storing and formatting said entered billing information; and
a systems control computer (SCS) connected to said room terminal via a radio frequency network, said SCS for storing and processing said entered billing information to facilitate payment for said amenity and presentation of said amenity on said television and including a graphics circuit for generating graphic user prompts for display on said television responsive to said processing, wherein contents of said graphic user prompts are prescribed by results of said processing.

14. The apparatus of claim 13 further comprising at least one data base connected to said SCS for validating said entered billing information, said at least one data base including account information associated with said entered billing information.

15. The apparatus of claim 14 further comprising a modem for operationally interconnecting said SCS and said at least one data base.

16. The apparatus of claim 14 wherein said SCS generates additional graphic user prompts using said account information of said at least one data base.

17. The apparatus of claim 14 wherein said billing information comprises a debit card number or an automatic teller machine (ATM) card number and an associated personal identification number (PIN) and said account information comprises an account balance, said SCS causing a billing amount associated with said amenity to be deducted from said account balance.

18. The apparatus of claim 14 wherein said billing information comprises a credit card number and said account information comprises a list of purchase amounts, said SCS causing a billing amount associated with said amenity to be added to said account information.

19. The apparatus of claim 14 wherein said at least one data base returns an authorization signal to said SCS upon receipt from said SCS of valid billing information, said SCS preventing presentation of said amenity until said authorization signal is returned.

20. The apparatus of claim 19 wherein said entering means is electrically powered by said television via said room terminal.

21. The apparatus of claim 14 wherein said billing information comprises a credit or debit card number.

22. The apparatus of claim 14 wherein said billing information comprises an automatic teller machine (ATM) card number and associated personal identification number (PIN).

23. The apparatus of claim 13 wherein said entering means comprises a remote control keypad.

24. The apparatus of claim 13 wherein said entering means comprises a card reader.

25. The apparatus of claim 24 wherein said card reader is electrically powered by said television.

26. The apparatus of claim 13 wherein said entering means, said room terminal and said SCS are interconnected via a radio frequency (RF) transmission network.

27. The apparatus of claim 13 wherein said entering means, said room terminal and said SCS are interconnected via a digital transmission network.

28. The apparatus of claim 13 wherein said selecting means comprises a remote control keypad.

29. The apparatus of claim 13 further comprising means connected to said room terminal for enabling a user to enter user information to said SCS in response to said graphic user prompts displayed on said television.

30. The apparatus of claim 29 wherein said SCS generates additional graphic user prompts responsive to said entered user information.

31. The apparatus of claim 14 wherein said room terminal is electrically powered by said television.

32. The apparatus of claim 14 wherein a plurality of icons for display on said television are stored in a memory of said television and or said room terminal, said television and/or said room terminal comprising a processor for causing certain ones of said plurality of icons to be displayed on said television in response to said entered billing information.

33. The apparatus of claim 13 wherein said SCS generates and transmits audio user prompts to said user using said television.

34. Apparatus for enabling a user at a hospitality location having a television to access and pay for video services and amenities, the apparatus comprising:
means for entering billing information;
means for selecting an amenity;
a room terminal directly connected to said television and further connected to said entering means, said room terminal for storing and formatting said entered billing information; and
a systems control computer (SCS) connected to said room terminal via a digital network, said SCS for storing and processing said entered billing information to facilitate payment for said amenity and presentation of said amenity on said television and including a graphics circuit for generating graphic user prompts for display on said television responsive to said processing, wherein contents of said graphic user prompts are prescribed by results of said processing.

35. The apparatus of claim 34 further comprising at least one data base connected to said SCS for validating said entered billing information, said at least one data base including account information associated with said entered billing information, wherein said at least one data base returns an authorization signal to said SCS upon receipt from said SCS of valid billing information, said SCS preventing presentation of said amenity until said authorization signal is returned.

36. The apparatus of claim 35 further comprising:
logic for causing said graphics cirrcuit to present on said television graphic user prompts responsive to information entered by said user; and
logic for causing said graphics circuit to present on said television graphic user prompts using said account information of said at least one data base.

37. The apparatus of claim 34 wherein said ScS further comprises:
a sound card for generating audio user prompts to be conveyed to said user using said television responsive to said processing;
logic for causing said sound card to issue audio user prompts to said television responsive to said processing;
logic for causing said graphics circuit to issue graphics user prompts to said room terminal for display on said television responsive to said processing.

38. The apparatus of claim 34 wherein said ScS further comprises:
logic for causing said graphics circuit to present on said television graphic user prompts for assisting said user in selecting and entering billing information;
logic for causing said graphics circuit to present on said television graphic user prompts for assisting said user in selecting and accessing an amenity; and
logic for causing said graphics circuit to present on said television graphic user prompts for assisting said user in confirming billing information and amenity selection.

39. The apparatus of claim 34 wherein said room terminal is electrically powered by said television.

40. The apparatus of claim 39 wherein said entering means is electrically powered by said television via said room terminal.

41. The apparatus of claim 34 wherein a plurality of icons for display on said television are stored in a memory of said television, said room terminal comprising a processor for causing certain ones of said plurality of icons to be displayed on said television in response to said entered billing information.

42. Apparatus for enabling a user at a hospitality location having a television to access and pay for video services and amenities, the apparatus comprising:
means for entering billing information;
means for selecting an amenity;
a room terminal directly connected to said television and further connected to said entering means, said room terminal for storing and formatting said entered billing information; and
a systems control computer (SCS) connected to said room terminal via a radio frequency network, said SCS for storing and processing said entered billing information to facilitate payment for said amenity and presentation of said amenity on said television and including means for generating graphic user prompts for display on said television responsive to said processing, wherein contents of said graphic user prompts are prescribed by results of said processing.

43. The apparatus of claim 42 further comprising at least one data base connected to said SCS for validating said entered billing information, said at least one data base including account information associated with said entered billing information, wherein said at least one data base returns an authorization signal to said SCS upon receipt from said SCS of valid billing information, said SCS preventing presentation of said amenity until said authorization signal is returned.

44. The apparatus of claim 43 further comprising:
logic for causing said graphic user prompt generating means to present on said television graphic user prompts responsive to information entered by said user; and
logic for causing said graphic user prompt generating means to present on said television graphic user prompts using said account information of said at least one data base.

45. The apparatus of claim 42 wherein said SCS further comprises:
means for generating audio user prompts to said television;
logic for causing said audio user prompt generating means to issue audio prompts to said television responsive to said processing;
logic for causing said graphic user prompt generating means to issue prompts to said room terminal for presentation by said television responsive to said processing.

46. The apparatus of claim 42 wherein said SCS further comprises:
logic for causing said graphic user prompt generating means to present on said television graphic user prompts for assisting said user in selecting and entering billing information;
logic for causing said graphic user prompt generating means to present on said television graphic user prompts for assisting said user in selecting and accessing an amenity; and
logic for causing said graphic user prompt generating means to present on said television graphic user prompts for assisting said user in confirming billing information and amenity selection.

47. The apparatus of claim 42 wherein said room terminal is electrically powered by said television.

48. The apparatus of claim 47 wherein said entering means is electrically powered by said television via said room terminal.

49. The apparatus of claim 42 wherein a plurality of icons for display on said television are stored in a memory of said television, said room terminal comprising a processor for causing certain ones of said plurality of icons to be displayed on said television in response to said entered billing information.

* * * * *

UNITED STATES PATENT AND TRADEMARK OFFICE
CERTIFICATE OF CORRECTION

PATENT NO. : 5,661,517

DATED : August 26, 1997

INVENTOR(S) : Harry S. Budow and Joel A. Pugh

It is certified that error appears in the above-identified patent and that said Letters Patent is hereby corrected as shown below:

Column 3, line 29, "customers" should be --customers'--.

Column 3, line 30, "customers" should be --customers'--.

Column 3, line 59, "in when" should be -- in problems when--.

Column 4, line 6, "and would" should be -- and types would--.

Column 4, line 6, "Convenience" should be --convenience--.

Column 4, line 7, "point-of-sale type, transactions" should be --point-of-sale transactions--.

Column 4, line 8, "customers" should be --customers'--.

Column 4, line 11, "or" should be --for--.

Column 4, line 16, "point of-sale" should be --point-of-sale--.

Column 4, line 21, "a and" should be --a method and--.

Column 4, line 25, "with credit" should be --with a credit--.

Column 4, line 49, "Circuit" should be --circuit--.

Column 11, line 26, "computer thereto with a connected thereto" should be --computer 4 will be connected thereto--.

Column 11, line 27, "LAN The" should be --LAN. The--.

Column 12, line 26, "Customer" should be --customer--.

Column 14, line 31, "Card" should be --card--.

Column 17, line 50, "Originating" should be --originating--.

Column 19, lines 57 and 58, "The printers may be coupons. The fronting reports, bills, receipts and coupons." should read --The printers may be utilized for printing reports, bills, receipts and coupons.--

UNITED STATES PATENT AND TRADEMARK OFFICE
CERTIFICATE OF CORRECTION

PATENT NO. : 5,661,517
DATED : August 26, 1997
INVENTOR(S) : Harry S. Budow and Joel A. Pugh It is certified that error appears in the above-identified patent and that said Letters Patent is hereby corrected as shown below:

Column 22, line 29, "Systems" should be --systems--.

Column 24, line 8, "the commands the commands" should be --the processor 448 commands--.

Column 26, line 59, "systems-control" should be --systems control--.

Column 28, line 21, "Control" should be --control--.

Column 33, Claim 37, line 20, "ScS" should be --SCS--.

Column 33, Claim 38, line 31, "ScS" should be --SCS--.

Signed and Sealed this

Twenty-fourth Day of March, 1998

Attest:

BRUCE LEHMAN

*Attesting Officer*     Commissioner of Patents and Trademarks